United States Patent
Endo et al.

(10) Patent No.: US 9,150,091 B2
(45) Date of Patent: Oct. 6, 2015

(54) LIQUID PRESSURE CIRCUIT

(75) Inventors: Tsuneo Endo, Wako (JP); Shigeru Ibaraki, Wako (JP); Kazutaka Takahashi, Wako (JP); Daiki Sato, Wako (JP); Seiichiro Ishikawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 857 days.

(21) Appl. No.: 13/498,434

(22) PCT Filed: Sep. 30, 2010

(86) PCT No.: PCT/JP2010/067125
§ 371 (c)(1),
(2), (4) Date: Jun. 5, 2012

(87) PCT Pub. No.: WO2011/040553
PCT Pub. Date: Apr. 7, 2011

(65) Prior Publication Data
US 2012/0237362 A1 Sep. 20, 2012

(30) Foreign Application Priority Data
Oct. 1, 2009 (JP) .................................. 2009-229630

(51) Int. Cl.
*B60K 6/12* (2006.01)
*B60K 6/40* (2007.10)
(Continued)

(52) U.S. Cl.
CPC ... *B60K 6/12* (2013.01); *B60K 6/40* (2013.01); *F02N 7/08* (2013.01); *F16K 3/262* (2013.01);
(Continued)

(58) Field of Classification Search
CPC .. B60K 6/12; Y02T 10/6282; Y02T 10/6208; F15B 21/14; F15B 1/033; E02F 9/2217; F16H 61/4096; F16H 2061/0034
See application file for complete search history.

(56) References Cited

U.S. PATENT DOCUMENTS 2,349,641 A 5/1944 Tucker et al.
2,395,979 A 3/1946 Tucker et al.
(Continued)

FOREIGN PATENT DOCUMENTS

DE 196 13 845 A1 10/1996
DE 101 10 764 A1 9/2002
(Continued)

OTHER PUBLICATIONS

JP2006-249990A Machine translation to English from espacenet.com. Sep. 2006.*
(Continued)

*Primary Examiner* — Edward Look
*Assistant Examiner* — Michael Quandt
(74) *Attorney, Agent, or Firm* — Carrier Blackman & Associates, P.C.; Joseph P. Carrier; Anne G. Sabourin

(57) ABSTRACT

A liquid pressure circuit is provided in which connecting an accumulator (22) to a high pressure liquid path (Lh) by opening a cut-off valve (24a) and connecting a intake liquid path (Li) to the high pressure liquid path (Lh) by means of a switch valve (24b) enables a pump/motor (M) to be operated as a motor by liquid stored under pressure in the accumulator (22), connecting the accumulator (22) to the high pressure liquid path (Lh) by opening the cut-off valve (24a) and connecting the intake liquid path (Li) to a low pressure liquid path (Ll) by means of the switch valve (24b) enables the pump/motor (M) to be operated as a pump to thus store liquid of a tank (21) under pressure in the accumulator (22), and closing the cut-off valve (24a) and connecting the intake liquid path (Li) to the high pressure liquid path (Lh) by means of the switch valve (24b) enables the pump/motor (M) to rotate without load; it is therefore possible to switch between three circuits, that is, drive (motor operation), regeneration (pump operation), and neutral (load-free running) by a simple structure with a small number of components.

2 Claims, 21 Drawing Sheets

(51) Int. Cl.
  *F02N 7/08* (2006.01)
  *F16K 3/26* (2006.01)
  *F16K 3/34* (2006.01)
  *F15B 13/04* (2006.01)
  *F15B 13/044* (2006.01)

(52) U.S. Cl.
  CPC ........... *F16K 3/34* (2013.01); *F15B 13/0406* (2013.01); *F15B 13/0444* (2013.01); *Y02T 10/6208* (2013.01); *Y02T 10/6282* (2013.01); *Y10T 137/3127* (2015.04); *Y10T 137/8671* (2015.04); *Y10T 137/86533* (2015.04); *Y10T 137/86702* (2015.04); *Y10T 137/86734* (2015.04); *Y10T 137/86751* (2015.04); *Y10T 137/88022* (2015.04)

(56) References Cited

U.S. PATENT DOCUMENTS

| | | | | |
|---|---|---|---|---|
| 2,593,316 | A * | 4/1952 | Kraft | 417/540 |
| 3,018,622 | A | 1/1962 | Werts | |
| 3,069,025 | A | 12/1962 | Winkler et al. | |
| 3,185,439 | A | 5/1965 | Inaba et al. | |
| 3,213,881 | A | 10/1965 | Findlay et al. | |
| 4,037,620 | A | 7/1977 | Johnson | |
| 4,109,683 | A | 8/1978 | Strache | |
| 4,387,783 | A * | 6/1983 | Carman | 180/165 |
| 4,697,929 | A | 10/1987 | Muller | |
| 4,700,747 | A | 10/1987 | Wartelle | |
| 4,779,512 | A | 10/1988 | Leonard | |
| 4,793,133 | A | 12/1988 | White et al. | |
| 4,800,924 | A | 1/1989 | Johnson | |
| 4,964,612 | A | 10/1990 | Maggioni et al. | |
| 4,977,816 | A | 12/1990 | Kuttruf | |
| 5,242,150 | A | 9/1993 | Shiffler et al. | |
| 5,467,800 | A | 11/1995 | Sallas | |
| 5,522,416 | A | 6/1996 | Farrell et al. | |
| 5,950,664 | A | 9/1999 | Battaglia | |
| 5,954,093 | A | 9/1999 | Leonard | |
| 5,971,604 | A | 10/1999 | Linga et al. | |
| 6,594,992 | B1 | 7/2003 | Naito et al. | |
| 6,739,127 | B2 * | 5/2004 | Nippert et al. | 60/414 |
| 6,769,451 | B2 | 8/2004 | Hjelsand | |
| 6,826,988 | B2 | 12/2004 | Gass et al. | |
| 7,322,375 | B2 | 1/2008 | Goldfarb et al. | |
| 7,574,859 | B2 * | 8/2009 | Epshteyn | 60/413 |
| 8,646,558 | B2 * | 2/2014 | Epshteyn | 180/165 |
| 2002/0079003 | A1 | 6/2002 | Scampini | |
| 2006/0108860 | A1 * | 5/2006 | Stragier | 303/15 |
| 2008/0104955 | A1 | 5/2008 | Khalil | |

FOREIGN PATENT DOCUMENTS

| | | |
|---|---|---|
| GB | 2 104 249 A | 3/1983 |
| JP | S58-75023 U | 5/1983 |
| JP | S63-501635 A | 6/1988 |
| JP | H04-238739 A | 8/1992 |
| JP | H06-29963 U | 4/1994 |
| JP | H08-104147 A | 4/1996 |
| JP | 2000-272890 A | 10/2000 |
| JP | 2001-027340 A | 1/2001 |
| JP | 2002-347671 A | 12/2002 |
| JP | 2006-037820 A | 2/2006 |
| JP | 2006-249990 A * | 9/2006 |
| JP | 2007-224737 A | 9/2007 |
| JP | 2008-121697 A | 5/2008 |
| JP | 2008-247320 A | 10/2008 |
| JP | 2009-068553 A | 4/2009 |
| JP | 2009-126398 A | 6/2009 |
| JP | 2009-255611 A | 11/2009 |
| WO | 03/016761 A1 | 2/2003 |

OTHER PUBLICATIONS

U.S. Office Action issued in co-pending U.S. Appl. No. 13/498,399, dated Dec. 13, 2013.

* cited by examiner

FIG.4
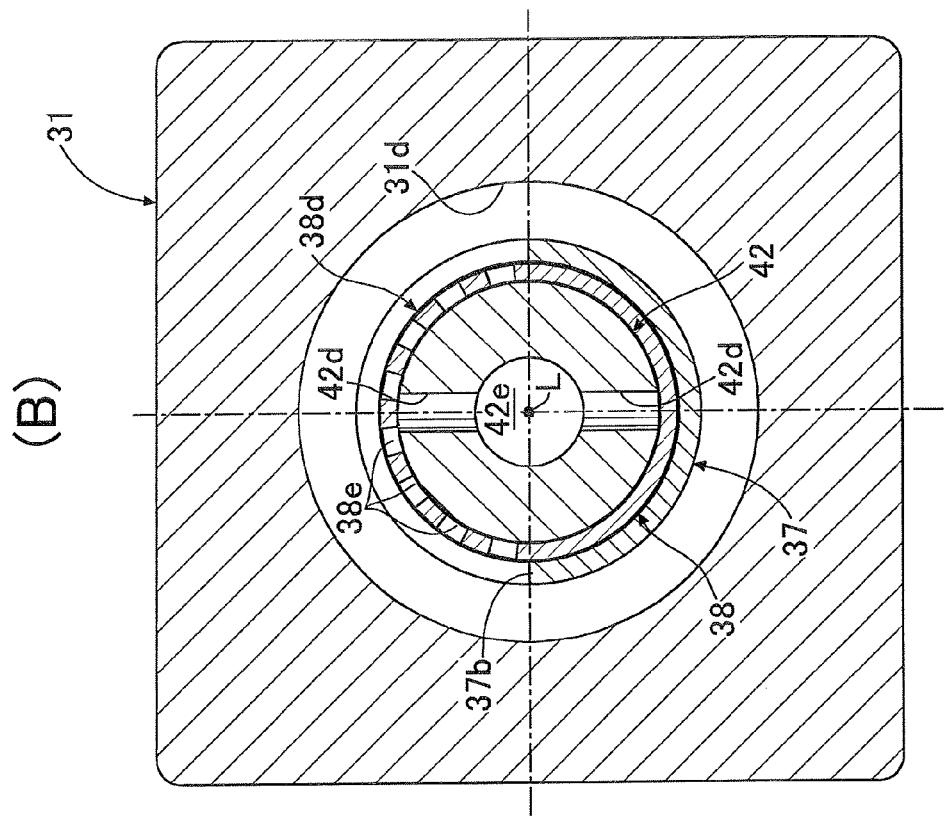
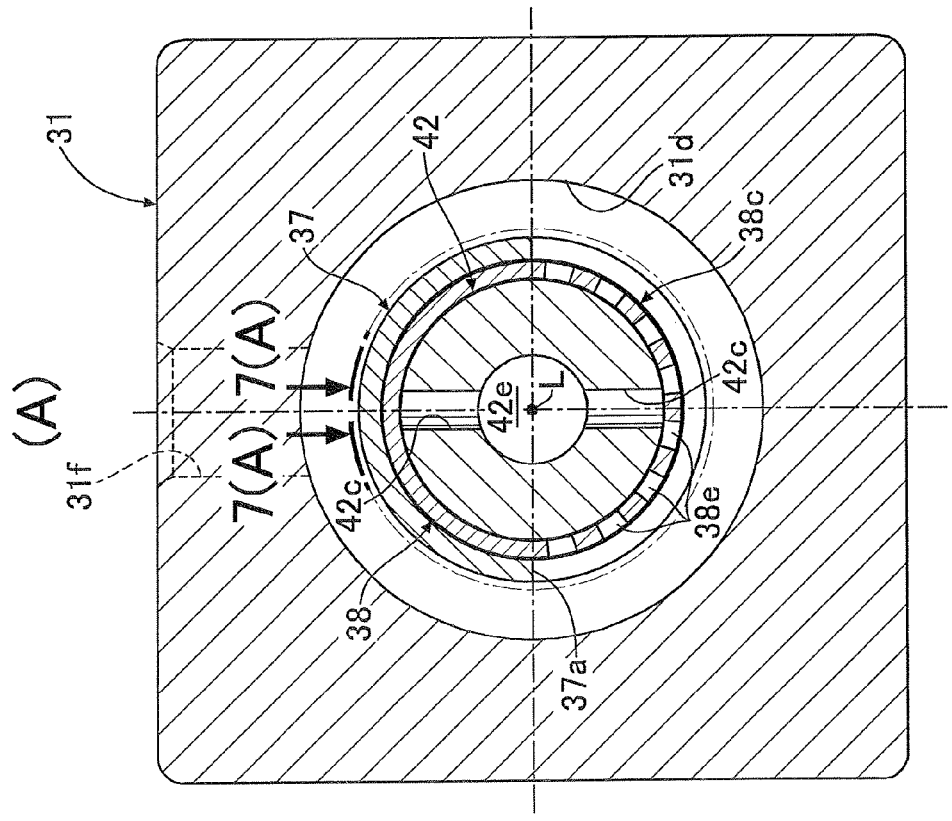

LIQUID PRESSURE CIRCUIT

TECHNICAL FIELD

The present invention relates to a liquid pressure circuit that has provided between an accumulator and a tank a pump/motor that can operate as a motor and a pump, the liquid pressure circuit controlling an output of the motor and a capacity of the pump by duty controlling a flow rate of a liquid by means of a flow rate control valve.

BACKGROUND ART

A liquid flow rate control valve that enables the flow rate of a liquid to be PWM-controlled at any duty ratio and any duty frequency is known from Patent Document 1 below. With regard to this liquid flow rate control valve, a cylindrical valve plate 40 having left and right edge parts formed into a wave shape is disposed in the interior of an outer tube 10 having one input port 11 and two, that is, first and second, output ports 12 and 13 so that the cylindrical valve plate 40 can be rotated by a drive source, a control plate 50 having a plurality of first and second opening groups 41 and 42 is disposed between an outer peripheral face of the valve plate 40 and an inner peripheral face of the outer tube 10 so that the control plate 50 can be moved in the axial direction by a drive source, and a liquid supplied from the input port 11 of the outer tube 10 is made to pass through the first and second opening groups 41 and 42 of the control plate 50 and the left and right wave-shaped edge parts of the valve plate 40 and be discharged from the first and second output ports 12 and 13 of the outer tube 10. In this process, changing the period during which the first and second opening groups 41 and 42 of the control plate 50 are open and the period during which they are closed by the left and right wave-shaped edge parts of the rotating valve plate 40 in response to the axial position of the control plate 50 enables the duty ratio of liquid discharged from the first and second output ports 12 and 13 to be freely controlled, and changing the rotational speed of the valve plate 40 enables the duty frequency of liquid discharged from the first and second output ports 12 and 13 to be freely controlled.

Patent Document 1: Japanese Patent Application Laid-open No. 2009-68553

SUMMARY OF THE INVENTION

Problems to be Solved by the Invention

Applying the above-mentioned liquid flow rate control valve, which PWM-controls the flow rate of a liquid, to a liquid pressure circuit that extracts power by operating a pump/motor as a motor when discharging to the tank liquid stored under pressure in the accumulator and that stores liquid of the tank under pressure in the accumulator by operating the pump/motor as a pump enables the output when the pump/motor operates as a motor and the capacity when the pump/motor operates as a pump to be freely controlled.

When the flow rate of liquid flowing through the pump/motor is PWM-controlled by means of the liquid flow rate control valve, the pump/motor repeatedly alternates between a loaded state (load state) and a load-free state (no-load state), and there is a possibility of motor operation or pump operation being inhibited due to the occurrence of pressure change on the intake port side or the discharge port side of the pump/motor. Furthermore, there is a possibility that, when the pump/motor operates as a pump, the pressure at the intake port will become negative and cavitation will occur.

The present invention has been accomplished in light of the above-mentioned circumstances, and it is an object thereof to provide a liquid pressure circuit that can enhance operating efficiency and operating stability of a pump/motor that is PWM-controlled by means of a liquid flow rate control valve.

Means for Solving the Problems

In order to attain the above object, according to a first aspect of the present invention, there is provided a liquid pressure circuit that has provided between an accumulator and a tank a pump/motor that can operate as a motor and a pump, the liquid pressure circuit controlling an output of the motor and a capacity of the pump by duty controlling a flow rate of a liquid by means of a flow rate control valve, the liquid pressure circuit comprising a high pressure liquid path connected to the accumulator via a cut-off valve, a low pressure liquid path connected to the tank, an intake liquid path connected to an intake port of the pump/motor, a discharge liquid path connected to a discharge port of the pump/motor, a switch valve that connects the intake liquid path selectively to one of the high pressure liquid path and the low pressure liquid path, a check valve that is disposed between the high pressure liquid path and the discharge liquid path and only allows liquid to flow from the discharge liquid path to the high pressure liquid path, and the flow rate control valve disposed between the low pressure liquid path and the discharge side of the liquid path.

Further, according to a second aspect of the present invention, in addition to the first aspect, an air chamber is connected between the tank and the switch valve in the low pressure liquid path.

Furthermore, according to a third aspect of the present invention, there is provided a liquid pressure circuit that has provided between an accumulator and a tank a pump/motor that can operate as a motor and a pump, the liquid pressure circuit controlling an output of the motor and a capacity of the pump by duty controlling a flow rate of a liquid by means of a flow rate control valve, the liquid pressure circuit comprising a high pressure liquid path connected to the accumulator, a low pressure liquid path connected to the tank, first and second intake liquid paths connected to an intake port of the pump/motor, a discharge liquid path connected to a discharge port of the pump/motor, a check valve that is disposed in the first intake liquid path and only allows liquid to flow from the low pressure liquid path to the first intake liquid path, the flow rate control valve disposed in the second intake liquid path, and a switch valve that switches connection states of the high pressure liquid path, the low pressure liquid path, the second intake liquid path, and the discharge liquid path, the switch valve being capable of switching between a drive position in which the discharge liquid path is connected to the low pressure liquid path and the high pressure liquid path is connected to the second intake liquid path, a regeneration position in which the discharge liquid path is connected to the high pressure liquid path and the second intake liquid path and the low pressure liquid path is cut off, and a neutral position in which the discharge liquid path is connected to the low pressure liquid path and the high pressure liquid path and the second intake liquid path are cut off.

Moreover, according to a fourth aspect of the present invention, in addition to the third aspect, an air chamber is connected between the tank and a part of the low pressure liquid path that is connected to the first intake liquid path.

Effects of the Invention

In accordance with the first aspect of the present invention, connecting the accumulator to the high pressure liquid path by opening the cut-off valve and connecting the intake liquid path to the high pressure liquid path by means of the switch valve enables the pump/motor to be operated as a motor by liquid stored under pressure in the accumulator, connecting the accumulator to the high pressure liquid path by opening the cut-off valve and connecting the intake liquid path to the low pressure liquid path by means of the switch valve enables the pump/motor to be operated as a pump to thus store liquid of the tank under pressure in the accumulator, and closing the cut-off valve and connecting the intake liquid path to the high pressure liquid path by means of the switch valve enables the pump/motor to rotate without load; it is therefore possible to switch between three circuits, that is, drive (motor operation), regeneration (pump operation), and neutral (load-free running) by a simple structure with a small number of components.

When the pump/motor operates as a motor, since the pressure of the intake port, which becomes the high pressure side, does not change even if the flow rate control valve is opened and closed, it becomes possible to operate the pump/motor in a stable manner.

When the pump/motor operates a pump, if the flow rate control valve opens and becomes duty ON, liquid circulates without load through a closed circuit passing through the switch valve, the pump/motor, and the flow rate control valve and attains a no-load state, and at this time the closed circuit attains a low pressure, which is the same as that of the tank, thus reducing liquid leakage.

Furthermore, in accordance with the second aspect of the present invention, since the air chamber is connected between the tank and the switch valve in the low pressure liquid path, change in pressure of the intake port when the pump/motor operates as a pump is alleviated by the air chamber, thereby preventing effectively the occurrence of cavitation.

Moreover, in accordance with the third aspect of the present invention, connecting the discharge liquid path to the low pressure liquid path and connecting the high pressure liquid path to the second intake liquid path by switching the switch valve to the drive position enables the pump/motor to be operated as a motor by liquid stored under pressure in the accumulator, connecting the discharge liquid path to the high pressure liquid path and the second intake liquid path by switching the switch valve to the regeneration position and cutting off the low pressure liquid path enables the pump/motor to be operated as a pump to thus store liquid of the tank under pressure in the accumulator, and connecting the discharge liquid path to the low pressure liquid path by switching the switch valve to the neutral position and cutting off the high pressure liquid path and the second intake liquid path enables the pump/motor to rotate without load; it is therefore possible to switch between three circuits, that is, drive (motor operation), regeneration (pump operation), and neutral (load-free running) by a simple structure with a small number of components.

When the pump/motor operates as a pump, since the pressure of the discharge port, which becomes the high pressure side, does not change even if the flow rate control valve is opened and closed, it becomes possible to operate the pump/motor in a stable manner. Moreover, in this process, since the check valve, which has a relatively small flow resistance when the valve is open, is positioned in proximity to the intake port of the pump/motor, compared with a case in which a switch valve, which has a relatively large flow resistance when the valve is open, is positioned there, the intake resistance of the pump/motor decreases, and this is advantageous in terms of suppressing the occurrence of cavitation.

When the pump/motor operates as a pump, if the flow rate control valve closes and becomes duty OFF, the liquid circulates without load through a closed circuit passing through the pump/motor, the switch valve, and the check valve and attains a no-load state, and at this time the closed circuit attains a low pressure, which is the same as that of the tank, thus reducing liquid leakage.

Furthermore, in accordance with the fourth aspect of the present invention, since the air chamber is connected between the tank and the part of the low pressure liquid path connected to the first intake liquid path, change in pressure of the intake port when the pump/motor operates as a pump is alleviated by the air chamber, thereby preventing effectively the occurrence of cavitation.

BRIEF DESCRIPTION OF DRAWINGS

FIG. 4 is a sectional view along line 4-4 in FIG. 3. (first embodiment)

EXPLANATION OF REFERENCE NUMERALS AND SYMBOLS

Figure 1:
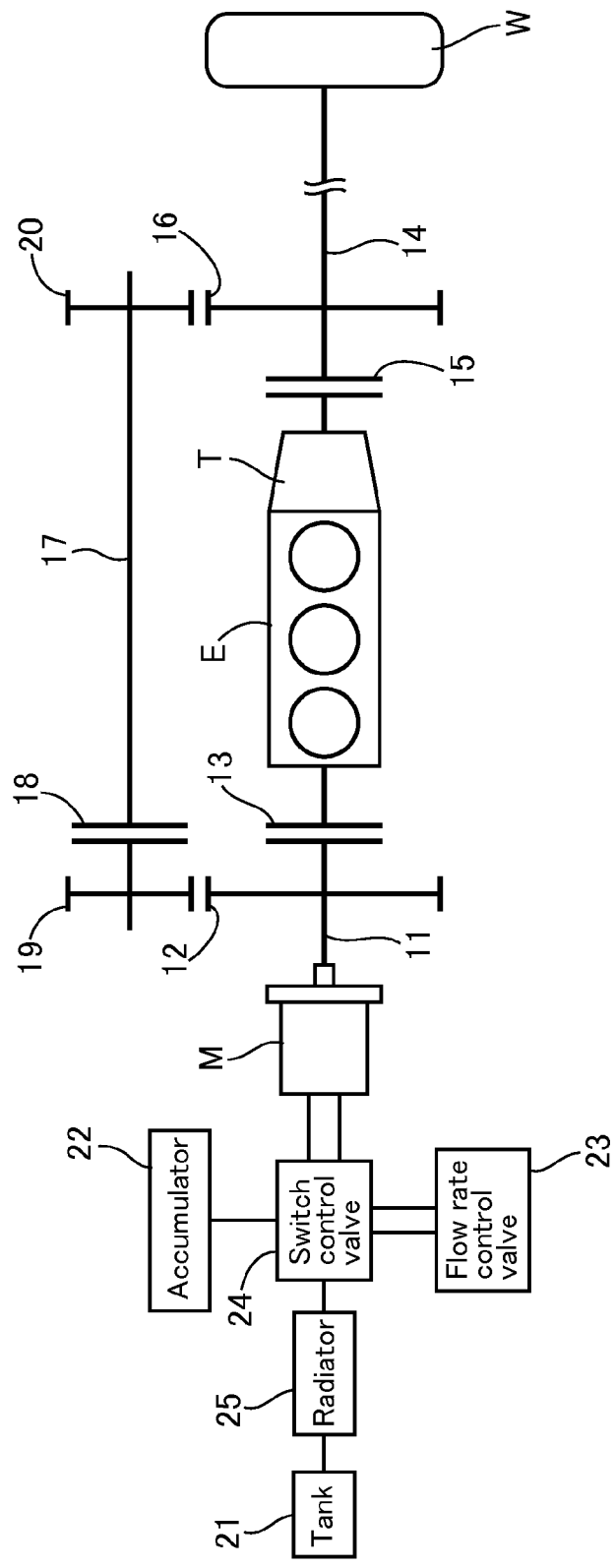
FIG. 1 is a diagram showing a driving force transmission system of a hydraulic hybrid vehicle. (first embodiment)
Figure 2:
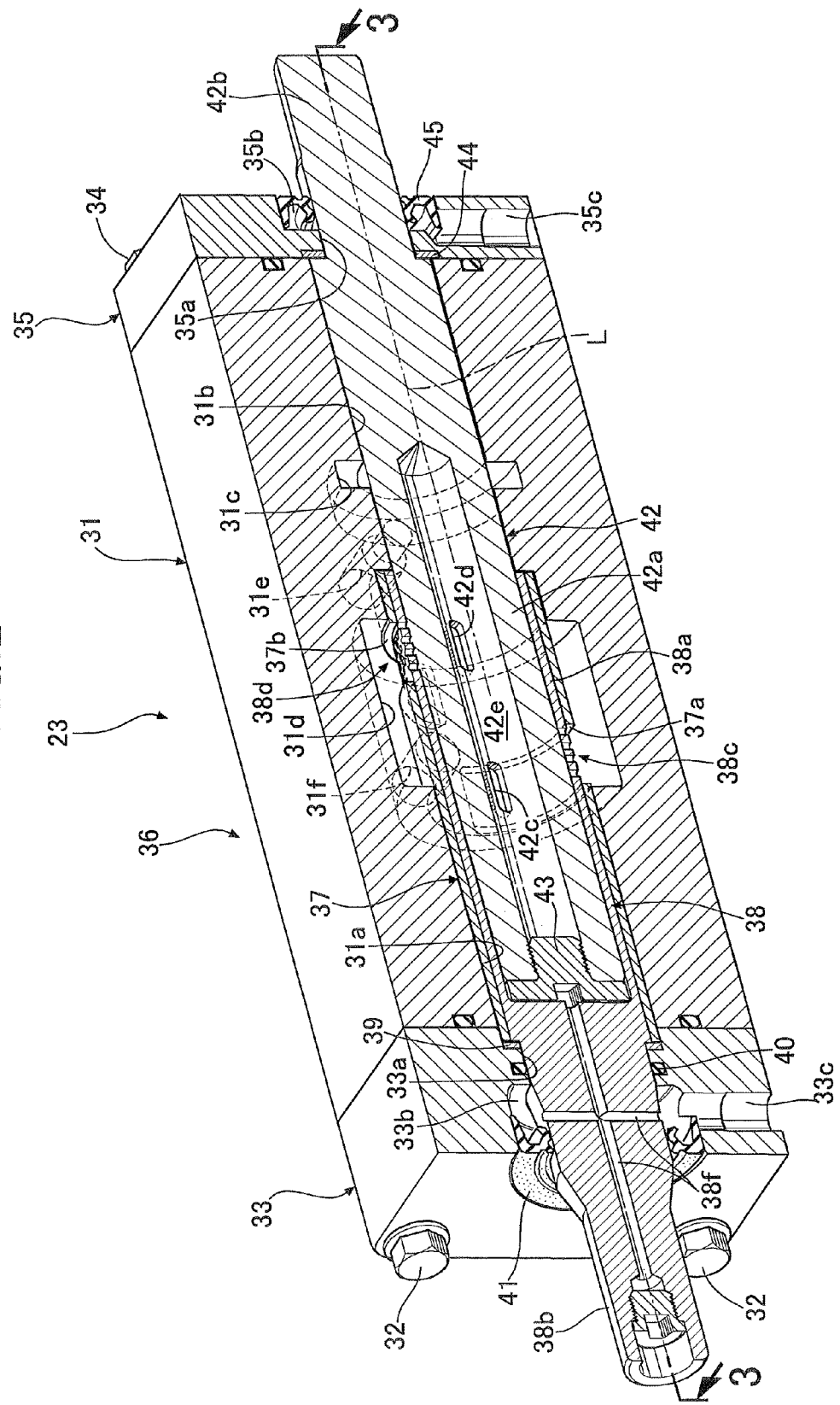
FIG. 2 is a sectional perspective view of a flow rate control valve. (first embodiment)
Figure 3:
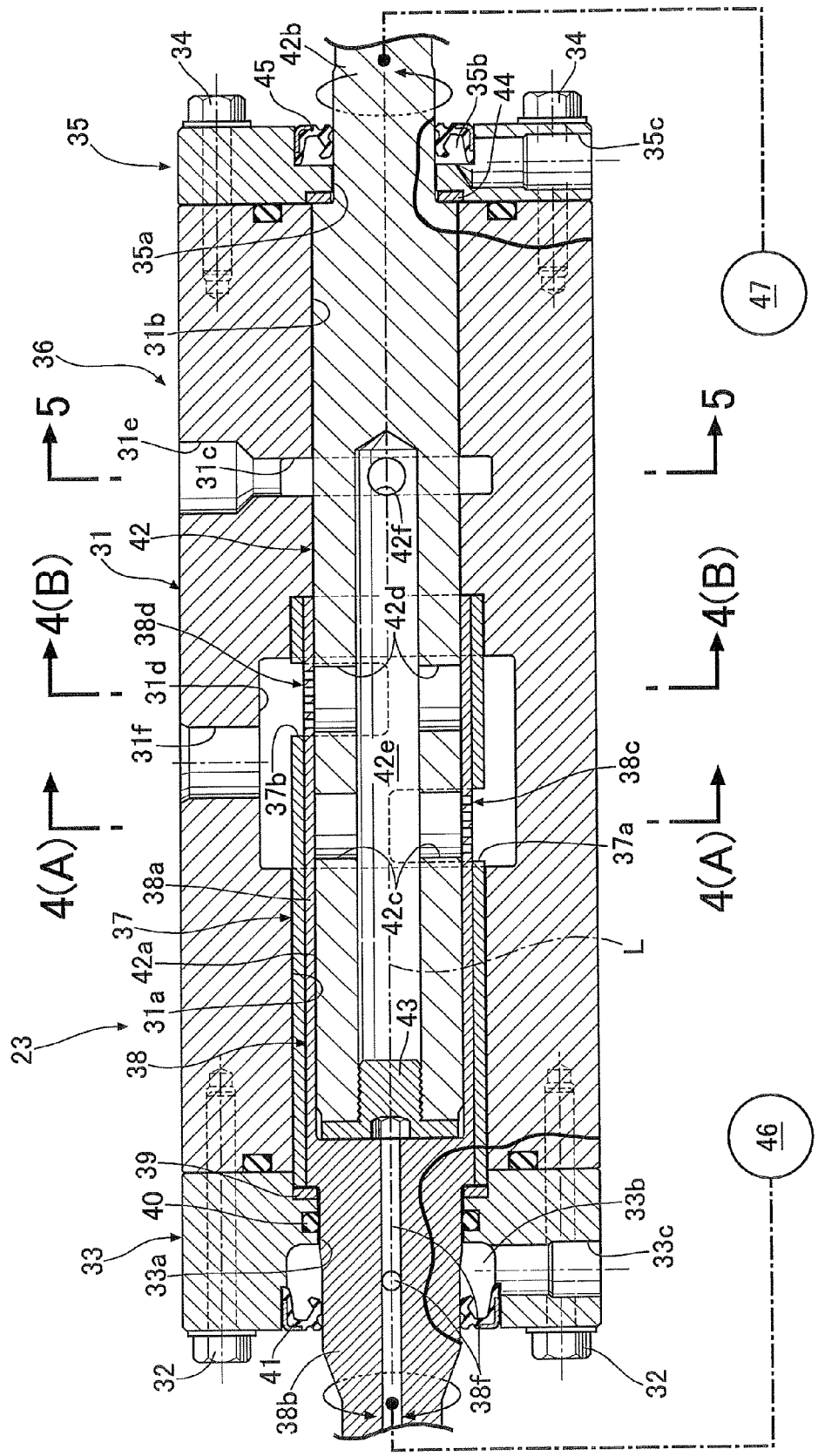
FIG. 3 is a sectional view along line 3-3 in FIG. 2. (first embodiment)
Figure 5:
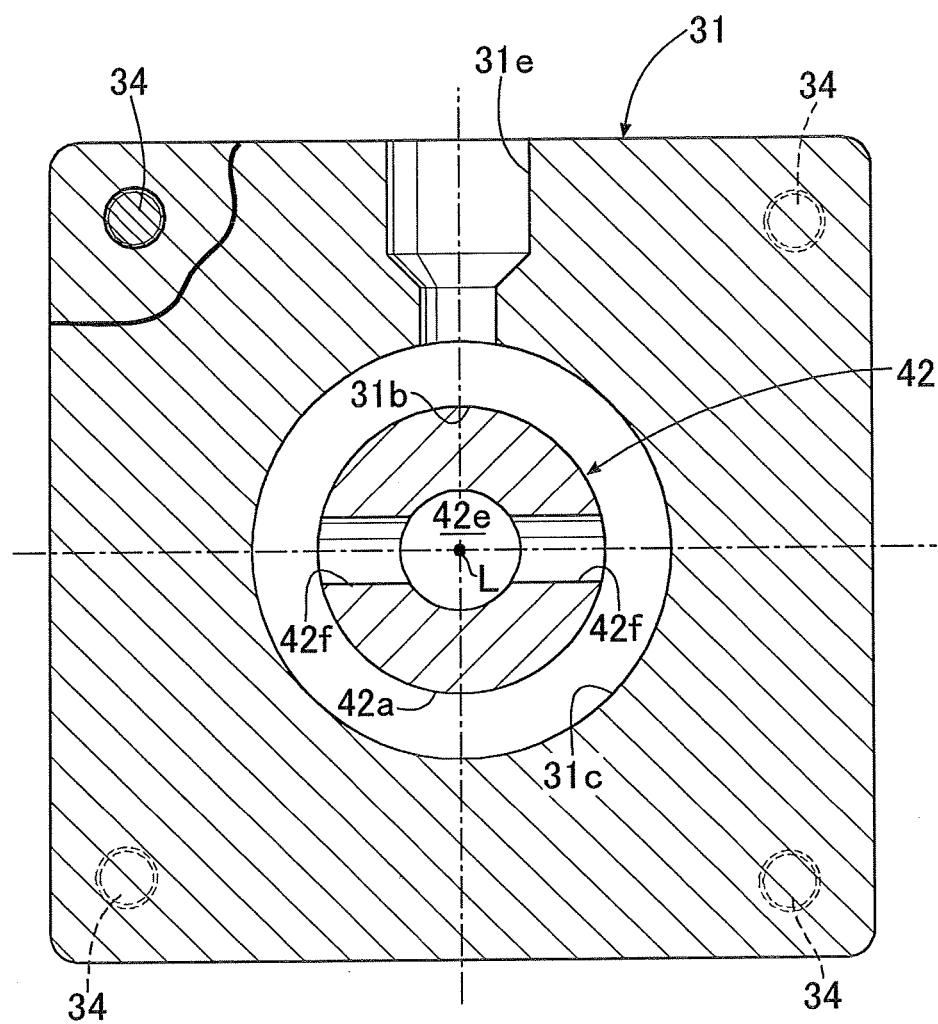
FIG. 5 is a sectional view along line 5-5 in FIG. 3. (first embodiment)
Figure 6:
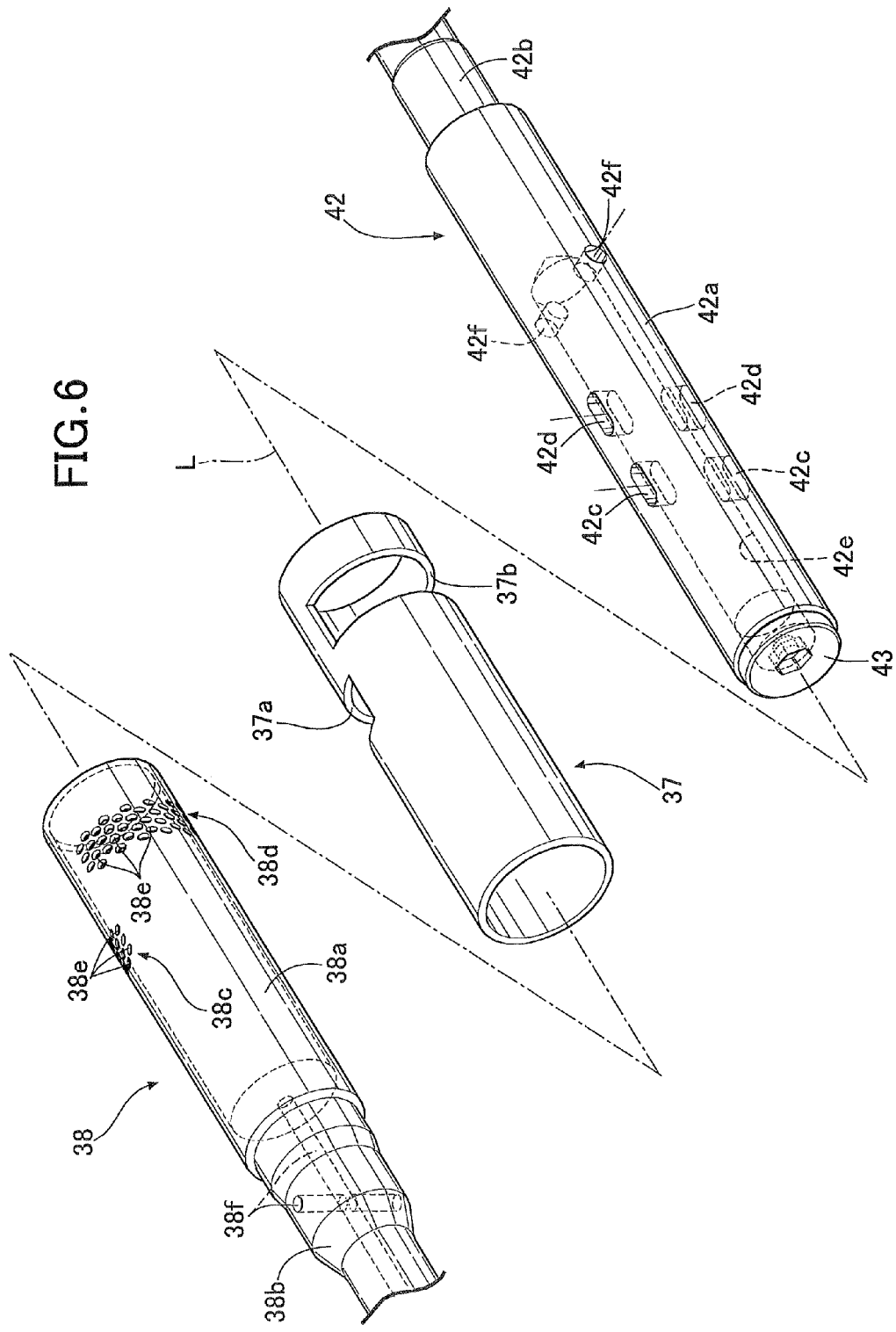
FIG. 6 is an exploded perspective view of a sleeve, a distributor, and a rotor. (first embodiment)

21 Tank
22 Accumulator
23 Flow rate control valve
24a Cut-off valve
24b Switch valve
48 Check valve
61 Switch valve
62 Air chamber
Lh High pressure liquid path
Li Intake liquid path
Li1 First intake liquid path
Li2 Second intake liquid path
Ll Low pressure liquid path
Lo Discharge liquid path
M Pump/motor

BEST MODE FOR CARRYING OUT THE INVENTION

First Embodiment

A first embodiment of the present invention is explained below by reference to FIG. 1 to FIG. 9.

As shown in FIG. 1, a hydraulic hybrid vehicle includes a pump/motor M, an engine E, and a transmission T, which are connected in series. For example, a linking shaft 11 connecting the engine E and the pump/motor M, which is formed from a gear motor, is provided with a first gear 12 and a first clutch 13, and an output shaft 14 connecting the transmission T and a driven wheel W is provided with a second clutch 15 and a second gear 16. A bypass shaft 17 bypassing the engine E and the transmission T is provided with a third clutch 18, a third gear 19 meshing with the first gear 12, and a fourth gear 20 meshing with the second gear 16.

The pump/motor M, a tank 21, an accumulator 22, and a flow rate control valve 23 are connected via a switch control valve 24, and the pump/motor M is switched between a state in which it operates as a motor by liquid pressure stored under pressure in the accumulator 22 and a state in which it operates as a pump that is externally driven and stores pressure in the accumulator 22. A radiator 25 for cooling the liquid is provided between the tank 21 and the switch control valve 24. The radiator 25 may be provided between the accumulator 22 and the switch control valve 24.

Therefore, in a state in which the first clutch 13 is engaged and the second clutch 15 and the third clutch 18 are disengaged, the pump/motor M is operated as a motor by means of liquid pressure stored under pressure in the accumulator 22 to thus start the engine E, and the engine E is driven and the pump/motor M is operated as a pump to thus store pressure in the accumulator 22.

When the pump/motor M is driven by means of liquid pressure stored under pressure in the accumulator 22 in a state in which the third clutch 18 is engaged and the first clutch 13 and the second clutch 15 are disengaged, the driving force is transmitted to the driven wheel W via the path: linking shaft 11→first gear 12→third gear 19→third clutch 18→bypass shaft 17→fourth gear 20→second gear 16→output shaft 14, thereby starting or running the vehicle by means of the driving force of the pump/motor M. If the pump/motor M is subjected to regenerative braking in this state, the pump/motor M is operated as a pump by means of driving force transmitted back from the driven wheel W side to thus store pressure in the accumulator 22, thereby recovering kinetic energy of the vehicle as hydraulic energy.

In a state in which the second clutch 15 is engaged and the first clutch 13 and the third clutch 18 are disengaged, the driving force of the engine E is transmitted to the driven wheel W via the second clutch 15 and the output shaft 14, thereby starting or running the vehicle by means of the driving force of the engine E. If the first clutch 13 is further engaged in this state, the pump/motor M is operated as a motor to thus assist the driving force of the engine E with the driving force of the pump/motor M, and the pump/motor M is operated as a pump to thus store pressure in the accumulator 22.

The structure of the flow rate control valve 23 is now explained by reference to FIG. 2 to FIG. 6. The flow rate control valve 23 controls the flow rate of liquid supplied from the accumulator 22 to the pump/motor M when the pump/motor M is operated as a motor, and controls the flow rate of liquid supplied from the pump/motor M to the accumulator 22 when the pump/motor M is operated as a pump.

The flow rate control valve 23 includes a valve housing 36 formed from a center housing 31, a first end housing 33 connected to one end of the center housing 31 via bolts 32, and a second end housing 35 connected to the other end of the center housing 31 via bolts 34. A circular cross-section large diameter hole 31a and a circular cross-section small diameter hole 31b are coaxially formed on an axis L of the center housing 31, an annular input liquid chamber 31c is formed so as to surround the outer periphery of the small diameter hole 31b, and an annular output liquid chamber 31d is formed so as to surround the outer periphery of the large diameter hole 31a. An input port 31e communicating with the input liquid chamber 31c and an output port 31f communicating with the output liquid chamber 31d open on one side of the center housing 31.

A cylindrical sleeve 37 is press fitted into the large diameter hole 31a, which opens on said one end of the center housing 31. Formed in the sleeve 37 so as to face the output liquid chamber 31d are first and second outlet openings 37a and 37b each having a central angle of 180° with the axis L as a center. The first and second outlet openings 37a and 37b have a rectangular shape when the sleeve 37 is in a developed state, and are disposed so as to have phases displaced from each other by 180° and be spaced so as not to overlap one another in the axis L direction.

A distributor 38 includes a cylindrical portion 38a and a shaft portion 38b; the cylindrical portion 38a is relatively rotatably fitted into the inner periphery of the sleeve 37, and the shaft portion 38b extends relatively rotatably through a shaft hole 33a of the first end housing 33. The position in the axis L direction of the cylindrical portion 38a of the distributor 38 is restricted by a shim 39 disposed between itself and the first end housing 33. Formed in the cylindrical portion 38a are first and second communication hole groups 38c and 38d that can overlap with the first and second outlet openings 37a and 37b of the sleeve 37. The first and second communication hole groups 38c and 38d are formed from large numbers of circular communication holes 38e disposed in a staggered manner.

The shaft hole 33a of the first end housing 33 is provided with a seal ring 40 and a mechanical seal 41 for providing sealing between itself and the shaft portion 38b of the distributor 38, a drain chamber 33b formed between the seal ring 40 and the mechanical seal 41 communicating with the exterior of the first end housing 33 via a drain port 33c. Formed in the shaft portion 38b of the distributor 38 is a drain passage 38f for providing communication between a shaft end of a rotor 42 and the drain chamber 33b, thereby preventing a thrust in the axis L direction from acting on the rotor 42.

The rotor 42 includes a cylindrical portion 42a and a shaft portion 42b, the cylindrical portion 42a having an open end closed by a plug 43 and being relatively rotatably fitted into the inner periphery of the distributor 38, and the shaft portion 42b relatively rotatably extending through a shaft hole 35a of the second end housing 35. The position in the axis L direction of the cylindrical portion 42a of the rotor 42 is restricted by a shim 44 disposed between itself and the second end housing 35. Formed in the cylindrical portion 42a are two pairs, having a phase difference of 180°, of first and second inlet openings 42c and 42d that can communicate with the first and second communication hole groups 38c and 38d of the distributor 38 respectively. The first and second inlet openings 42c and 42d are formed into a slit shape extending in the axis L direction, and the width in the axis L direction coincides with the width in the axis L direction of the first and second outlet openings 37a and 37b and the first and second communication hole groups 38c and 38d.

The shaft hole 35a of the second end housing 35 is provided with a mechanical seal 45 for providing sealing between itself and the shaft portion 42b of the rotor 42, a drain chamber 35b formed between the center housing 31 and the mechanical seal 45 communicating with the exterior of the second end housing 35 via a drain port 35c. An interior space 42e of the rotor 42 communicates with the input liquid chamber 31c of the center housing 31 via a liquid hole 42f.

The shaft portion 38b of the distributor 38 is connected to a first electric motor 46 and is driven to rotate through 180° between a position at which the first and second communication hole groups 38c and 38d completely overlap the first and second outlet openings 37a and 37b of the sleeve 37 and a position at which they do not overlap at all. The shaft portion 42b of the rotor 42 is connected to a second electric motor 47 and driven to rotate at a variable speed.

The operation of the flow rate control valve 23 having the above-mentioned arrangement is now explained.

Figure 7:
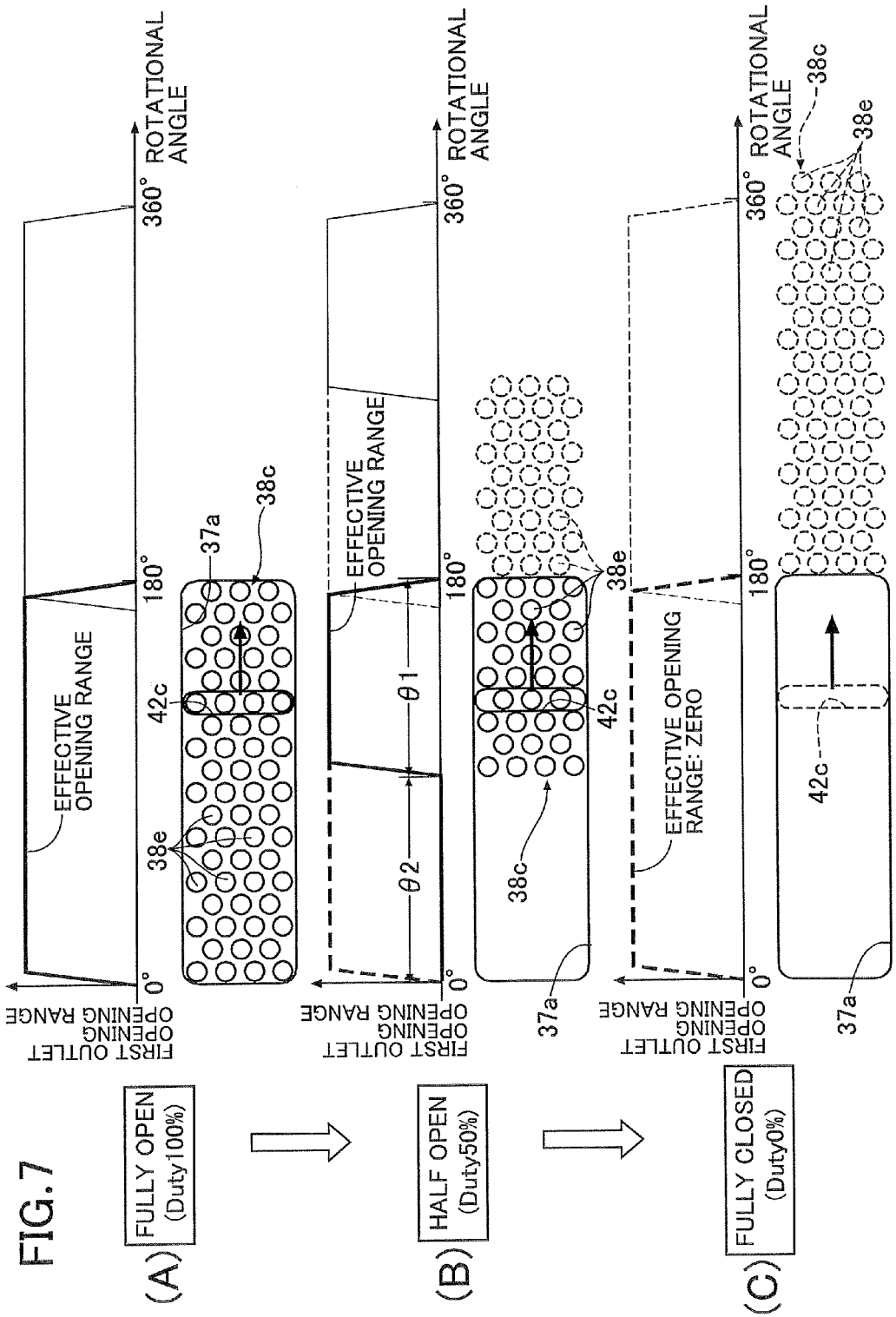
FIG. 7 is a developed view along line 7-7 in FIG. 4. (first embodiment)

FIG. 7 is a developed view along line 7-7 in FIG. 4 and shows a state in which the sleeve 37 fixed to the valve housing 36, the cylindrical portion 38a of the distributor 38, which is rotated relative to the sleeve 37 by the first electric motor 46 through a range of 0° to 180°, and the cylindrical portion 42a of the rotor 42, which is rotated relative to the sleeve 37 and the distributor 38 by the second electric motor 47 at a variable speed, are developed in the circumferential direction through 360°; FIG. 7(A) corresponds to a state in which the duty ratio=100% (fully open), FIG. 7(B) corresponds to a state in which the duty ratio=50% (half open), and FIG. 7(C) corresponds to a state in which the duty ratio=0% (fully closed).

The first outlet opening 37a of the sleeve 37 opens over a range of 0° to 180° of its central angle of 360°; in a state in which the duty ratio is 100% the first communication hole group 38c of the distributor 38 overlaps the first outlet opening 37a of the sleeve 37 throughout the entire region, and the effective open range of the first outlet opening 37a of the sleeve 37 is therefore 0° to 180°. In a state in which the duty ratio is 50%, the distributor 38 rotates relative to the sleeve 37 through 90° from left to right in the figure, the first communication hole group 38c of the distributor 38 overlaps the first outlet opening 37a of the sleeve 37 through half of the entire region, and the effective open range of the first outlet opening 37a of the sleeve 37 is therefore 90° to 180°. In a state in which the duty ratio is 0%, the distributor 38 rotates relative to the sleeve 37 through 180° from left to right in the figure, the first communication hole group 38c of the distributor 38 does not overlap the first outlet opening 37a at all, and the effective open range of the first outlet opening 37a of the sleeve 37 is therefore zero.

When the rotor 42 is rotated by the second electric motor 47 relative to the sleeve 37 and the distributor 38, the two first inlet openings 42c and 42c provided in the rotor 42 at a phase difference of 180° move from the left side to the right side in the figure. FIG. 7 shows only one of the two first inlet openings 42c and 42c.

When the pump/motor M is operated as a motor, the input port 31e of the center housing 31 is connected to the accumulator 22, and the output port 31f of the center housing 31 is connected to the tank 21. Therefore, high pressure liquid of the accumulator 22 is supplied to the interior space 42e of the rotor 42 via the path: input port 31e of center housing 31→input liquid chamber 31c of center housing 31→liquid hole 42f of rotor 42. When the first inlet opening 42c facing the interior space 42e of the rotor 42 overlaps the effective open range of the first outlet opening 37a of the sleeve 37, the liquid of the interior space 42e is returned to the tank 21 via the path: first inlet opening 42c of rotor 42→first communication hole group 38c of distributor 38→first outlet opening 37a of sleeve 37→output liquid chamber 31d of center housing 31→output port 31f of center housing 31, and the pump/motor M operates as a motor.

In this process, since the first and second communication hole groups 38c and 38d of the distributor 38 are formed from large numbers of communication holes 38e, which are separated from each other, it is possible to prevent the liquid from short circuiting in the circumferential direction via communication holes 38e that do not face the first and second outlet openings 37a and 37b of the sleeve 37.

Liquid that has passed between the inner periphery of the sleeve 37 and the outer periphery of the distributor 38 and has further passed through the seal ring 40 is discharged to the exterior of the valve housing 36 via the drain chamber 33b and the drain port 33c of the first end housing 33. Furthermore, liquid that has leaked between the inner periphery of the small diameter hole 31b of the center housing 31 and the outer periphery of the rotor 42 is discharged to the exterior of the valve housing 36 via the drain chamber 35b and the drain port 35c of the second end housing 35.

In FIG. 7(B), the sum of a load period θ1 in which the input port 31e and the output port 31f communicate and a no-load period θ2 in which the input port 31e and the output port 31f do not communicate is 180°, and θ1/(θ1+θ2) is the duty ratio. In this case, θ1=θ2=90°, and the duty ratio=50%. This duty ratio can be controlled so as to be in a range of 0% to 100% by changing the rotational angle of the distributor 38 by the first electric motor 46 in a range of 0° to 180°. For example, in the state of FIG. 7(A), θ1=180°, θ2=0°, and the duty ratio=100% (fully open). Furthermore, in the state of FIG. 7(C), θ1=0°, θ2=180°, and the duty ratio=0% (fully closed).

The above-mentioned first inlet opening 42c, first communication hole group 38c, and first outlet opening 37a of the flow rate control valve 23 output a duty waveform when the rotational angle of the rotor 42 is in a range of 0° to 180° and do not output a duty waveform when the rotational angle of the rotor 42 is in a range of 180° to 360°, and since the second inlet opening 42d adjacent to the first inlet opening 42c and the second communication hole group 38d and second outlet opening 37b having phases that are displaced relative to those of the first communication hole group 38c and first outlet opening 37a by 180° output the same duty waveform when the rotational angle of the rotor 42 is in a range of 180° to 360°, the flow rate control valve 23 outputs a duty waveform twice per rotation of the rotor 42. Therefore, when the speed at which the rotor 42 is rotated by means of the second electric motor 47 is defined as N, the frequency of the duty waveform outputted by the flow rate control valve 23 becomes 2N, and it is possible to obtain a high duty frequency while keeping the rotational speed of the second electric motor 47 low.

As described above, in accordance with the present embodiment, since the flow rate of liquid supplied from the accumulator 22 to the pump/motor M is duty controlled by the flow rate control valve 23, compared with a case in which the flow rate of liquid is controlled by a throttle valve, heat loss can be reduced to thus give high efficiency. In this process, selecting an optimum duty frequency by adjusting the rotational speed of the rotor 42 enables higher efficiency to be obtained. Moreover, since the liquid pressure of the input liquid chamber 31c and the output liquid chamber 31d does not generate a thrust load on the distributor 38 and the rotor 42 in the axis L direction, it becomes unnecessary to support the distributor 38 and the rotor 42 so as to withstand such a thrust load, and it is thus possible to simplify the structure and cut the weight and cost.

Furthermore, since the first and second outlet openings 37a and 37b of the sleeve 37 each have a central angle of 180°, if they overlapped one another in the axis L direction, the first and second outlet openings 37a and 37b would communicate with each other to thus divide the sleeve 37 into two members, but since they are displaced in the axis L direction it is possible to form the sleeve 37 from one member. Similarly, since the first and second communication hole groups 38c and 38d of the distributor 38 each have a central angle of 180°, if they overlapped one another in the axis L direction, the first and second communication hole groups 38c and 38d would overlap one another to thus degrade the rigidity of the distributor 38, but since they are displaced in the axis L direction it is possible to ensure the rigidity of the distributor 38.

A case in which the pump/motor M is operated as a motor is explained above, but the flow rate control valve 23 carries out PWM control of liquid flow rate in the same manner when the pump/motor M is operated as a pump.

The structure of a liquid pressure control circuit for switching the operation of the pump/motor M between a motor and a pump is now explained.

Figure 8:
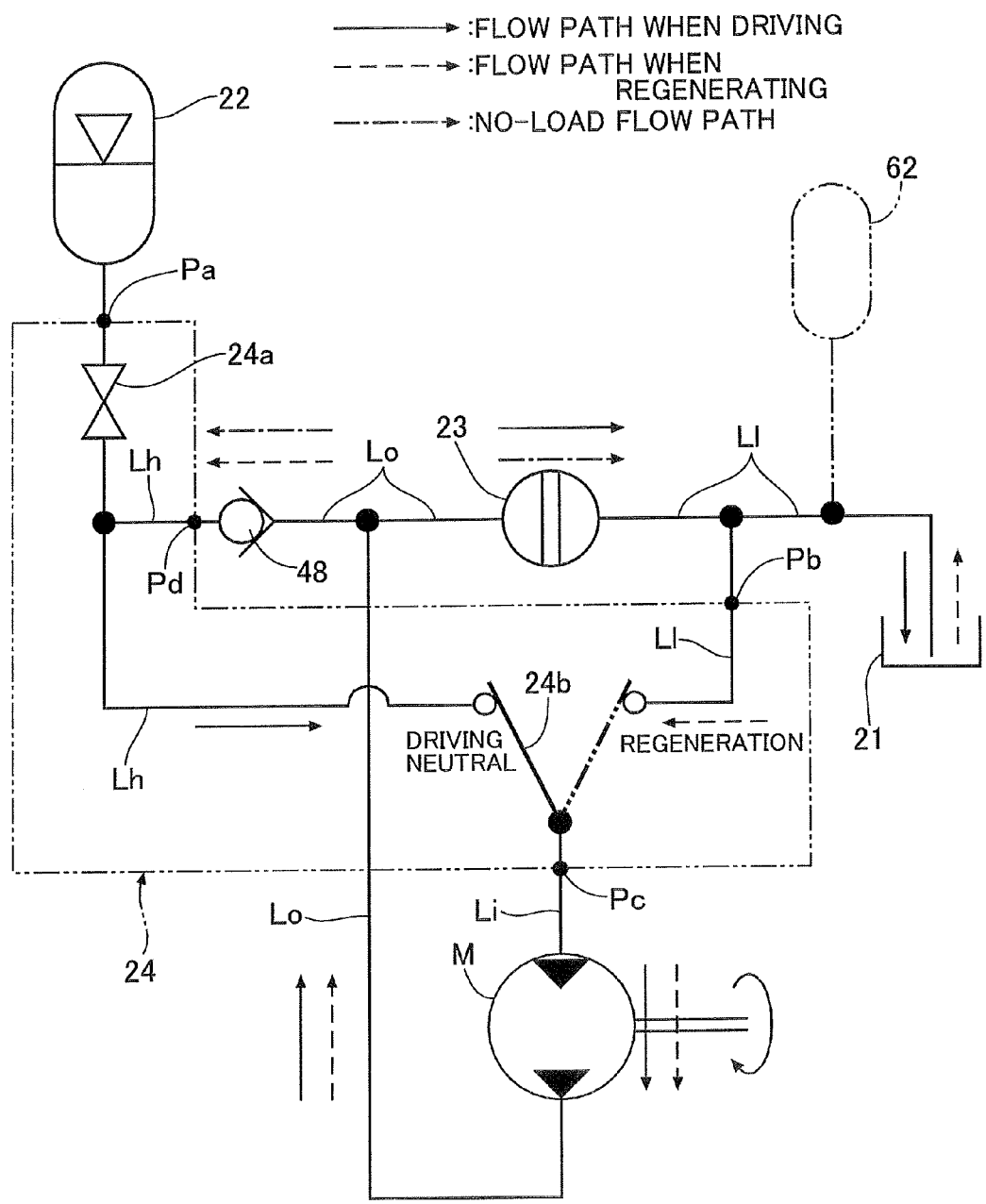
FIG. 8 is a diagram showing an equivalent circuit of a drive circuit for a pump/motor. (first embodiment)

FIG. 8 shows an equivalent circuit of the liquid pressure control circuit, the switch control valve 24 including four ports Pa, Pb, Pc, and Pd, a cut-off valve 24a, and a switch valve 24b. The port Pa is connected to the accumulator 22, the port Pb is connected to the tank 21, the port Pc is connected to the pump/motor M, and the port Pd is connected to the downstream side of a check valve 48. The cut-off valve 24a is disposed between the port Pa and the port Pd, and the port Pc is selectively connected to the ports Pa and Pd or the port Pb via the switch valve 24b. The upstream side of the check valve 48 is connected to the pump/motor M and is also connected to the port Pb and the tank 21 via the flow rate control valve 23.

A section between the cut-off valve 24a, the check valve 48, and the switch valve 24b forms a high pressure liquid path Lh, a section between the tank 21, the flow rate control valve 23, and the switch valve 24b forms a low pressure liquid path Ll, a section between the intake port of the pump/motor M and the switch valve 24b forms an intake liquid path Li, and a section between the discharge port of the pump/motor M, the check valve 48, and the flow rate control valve 23 forms a discharge liquid path Lo.

Figure 9:
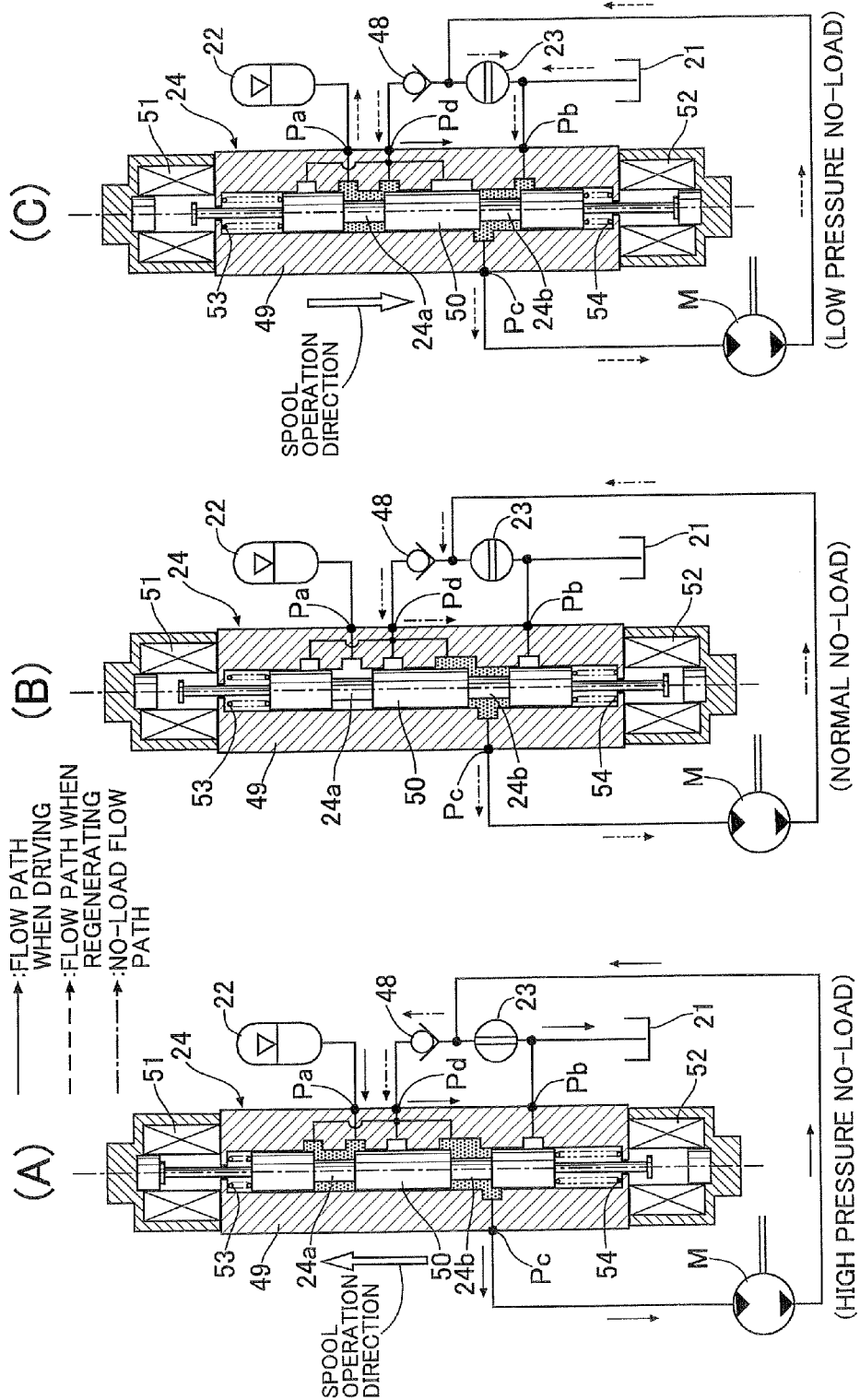
FIG. 9 is a diagram showing a drive circuit for the pump/motor. (first embodiment)

FIG. 9 is a liquid pressure circuit embodying the switch control valve 24 of the equivalent circuit of FIG. 8; the switch control valve 24 is formed from a spool 50 slidably fitted into a valve housing 49, two solenoids 51 and 52 driving the spool 50, and return springs 53 and 54 urging the spool 50 to a neutral position.

As shown in FIG. 8 and FIG. 9(A), when the pump/motor M is operated as a motor, the solenoid 51 is energized and the solenoid 52 is de-energized to thus move the spool 50 upward in the figure, the cut-off valve 24a is opened, and the switch valve 24b is switched toward the drive/neutral side. As a result, when the duty ratio of the flow rate control valve 23 is 100%, the liquid of the accumulator 22 flows via the path: port Pa→cut-off valve 24a→switch valve 24b→port Pc→pump/motor M→flow rate control valve 23→tank 21, thus enabling the pump/motor M to be driven.

When the duty ratio of the flow rate control valve 23 is 0%, liquid that has passed through the pump/motor M is blocked by the flow rate control valve 23 and cannot flow into the tank 21, and the liquid of the accumulator 22 therefore circulates in a closed no-load circuit via the path: port Pa→cut-off valve 24a→switch valve 24b→port Pc→pump/motor M→check valve 48→port Pd→switch valve 24b. In this process, since the liquid that is flowing in the no-load circuit is high pressure liquid of the accumulator 22 (high pressure no-load), it is possible to suppress effectively the occurrence of cavitation.

When the duty ratio of the flow rate control valve 23 is larger than 0% and smaller than 100%, during a duty ON period when the flow rate control valve 23 is open the pump/motor M is in a load state in which a driving force is generated, and during a duty OFF period when the flow rate control valve 23 is closed the pump/motor M is in a no-load state in which no driving force is generated.

As described above, when the pump/motor M operates as a motor, both when it is duty ON and when it is duty OFF, the pressure of the inlet port of the pump/motor M does not change and is maintained at a high pressure, and it is therefore possible to stabilize its operation.

As shown in FIG. 8 and FIG. 9(B), when the pump/motor M is operated as neither a motor nor a pump (neutral state), both the solenoid 51 and the solenoid 52 are de-energized to thus put the spool 50 into a neutral position, the cut-off valve 24a is closed, and the switch valve 24b is switched toward the drive/neutral side. As a result, the closed no-load circuit: pump/motor M→check valve 48→port Pd→switch valve 24b→port Pc→pump/motor M is formed, and the pump/motor M rotates without load.

As shown in FIG. 8 and FIG. 9(C), when the pump/motor M is operated as a pump, the solenoid 51 is de-energized and the solenoid 52 is energized to thus move the spool 50 downward in the figure, the cut-off valve 24a is opened, and the switch valve 24b is switched toward the regeneration side. As a result, when the duty ratio of the flow rate control valve 23 is 0%, since liquid pressurized by the pump/motor M cannot pass through the flow rate control valve 23, the liquid of the tank 21 flows via the path: port Pb→switch valve 24b→port Pc→pump/motor M→check valve 48→port Pd→cut-off valve 24a→port Pa→accumulator 22, and pressure can thereby be stored in the accumulator 22.

When the duty ratio of the flow rate control valve 23 is 100%, since liquid that has passed through the pump/motor M can pass through the flow rate control valve 23 without load, the liquid of the tank 21 circulates in a closed no-load circuit via the path: port Pb→switch valve 24b→port Pc→pump/motor M→flow rate control valve 23→port Pb. In this process, since the liquid that is flowing in the no-load circuit is low pressure liquid of the tank 21 (low pressure no-load), it is possible to prevent the liquid from leaking and to reduce the operating resistance of the pump/motor M and the flow rate control valve 23. In particular, since low pressure no-load is carried out when the pump/motor M operates as a pump, it is possible to minimize liquid leakage from the no-load circuit at that time.

When the duty ratio of the flow rate control valve 23 is larger than 0% and smaller than 100%, during a duty OFF period when the flow rate control valve 23 is closed the pump/motor M is in a load state in which a liquid pressure is generated, and during a duty ON period when the flow rate control valve 23 is open the pump/motor M is in a no-load state in which no liquid pressure is generated.

As described above, when the pump/motor M operates as a pump, both when it is duty ON and when it is duty OFF, the pressure of the outlet port of the pump/motor M does not change and is maintained at a high pressure, and it is therefore possible to stabilize its operation.

In the present embodiment, since the pump/motor M is used as a drive source for a hydraulic hybrid vehicle, although the rotational direction is the same both when the pump/motor M operates as a motor (when driving) and when it operates as a pump (when regeneratively braking), reversing the connective relationship between the tank 21 and the accumulator 22 by means of the switch control valve 24 enables driving and regenerative braking of the pump/motor M to be carried out without problem while requiring no mechanism for reversing the rotational direction of the pump/motor M. Furthermore, not only is it possible to carry out switching between driving, regeneration, and neutral with respect to the pump/motor M by means of a simple liquid pressure circuit using one switch control valve 24, but it is also possible to automatically form a high pressure no-load circuit when the pump/motor M is driving and to automatically form a low pressure no-load circuit when the pump/motor M is regeneratively braking.

Second and Third Embodiments

Figure 10:
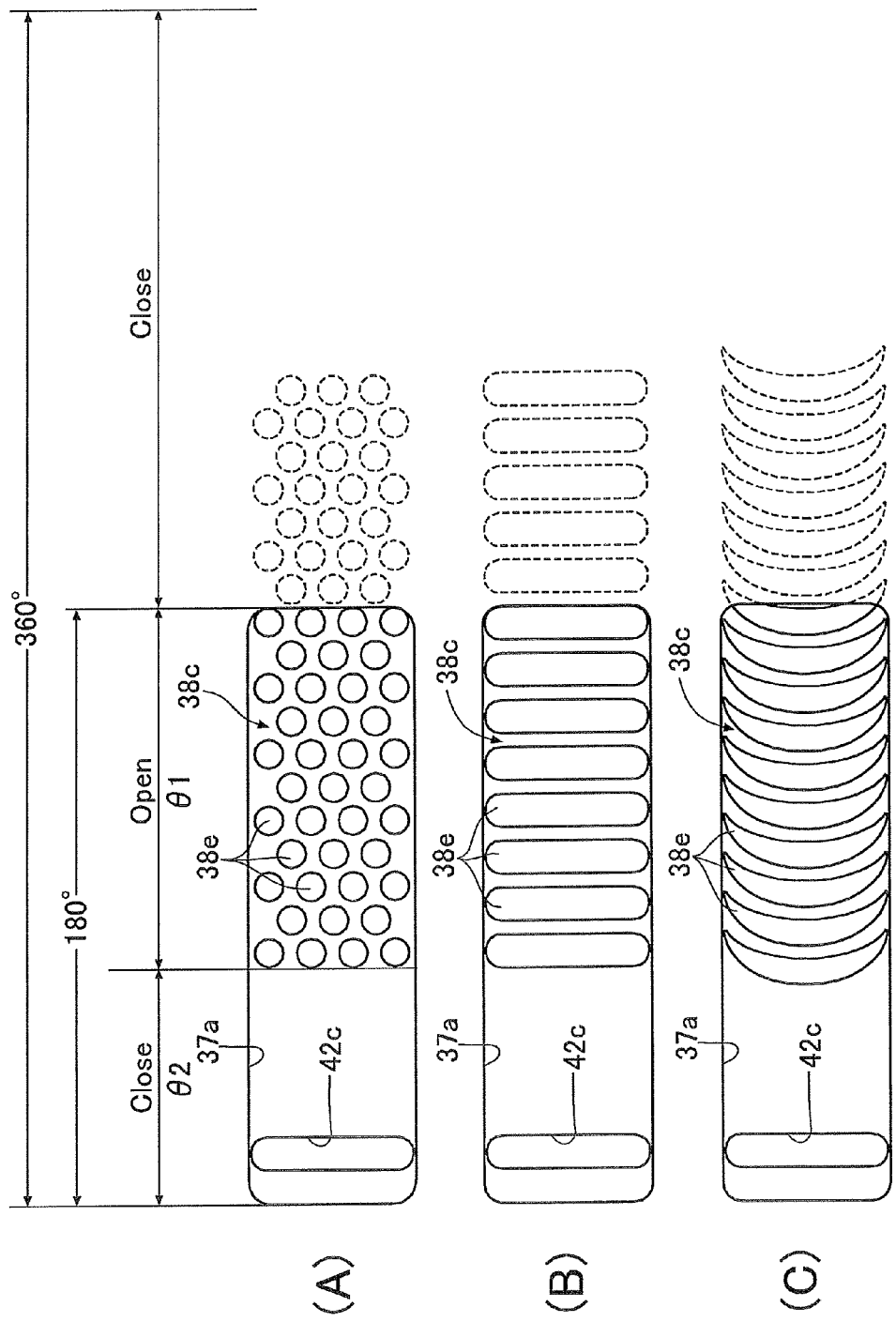
FIG. 10 is a diagram showing the shape of communication holes of a distributor. (second, third embodiments)

Second and third embodiments of the present invention are now explained by reference to FIG. 10.

The first and second communication hole groups 38c and 38d of the distributor 38 of the first embodiment are formed from a large number of circular communication holes 38e disposed in the axis L direction and the circumferential direction of the distributor 38 (see FIG. 10(A)), but first and second communication hole groups 38c and 38d of the second embodiment are formed by providing a large number of communication holes 38e in a row in the circumferential direction, the communication holes 38e having the same shape as that of first and second inlet openings 42c and 42d of a rotor 42 (that is, a slit shape that is narrow and long in an axis L direction of a distributor 38) (see FIG. 10(B)). In accordance with this embodiment, compared with the first embodiment, it is possible to increase the total opening area of the first and second communication hole groups 38c and 38d, thereby decreasing the resistance to circulation of liquid.

Furthermore, with regard to first and second communication hole groups 38c and 38d of the third embodiment, the shape of the communication holes 38e of the second embodiment is changed from the narrow and long slit shape into a crescent shape (see FIG. 10(C)). In accordance with this embodiment, degradation of the rigidity of the distributor 38 due to the first and second communication hole groups 38c and 38d being formed can be minimized while decreasing the resistance to circulation of liquid.

Fourth Embodiment

Figure 11:
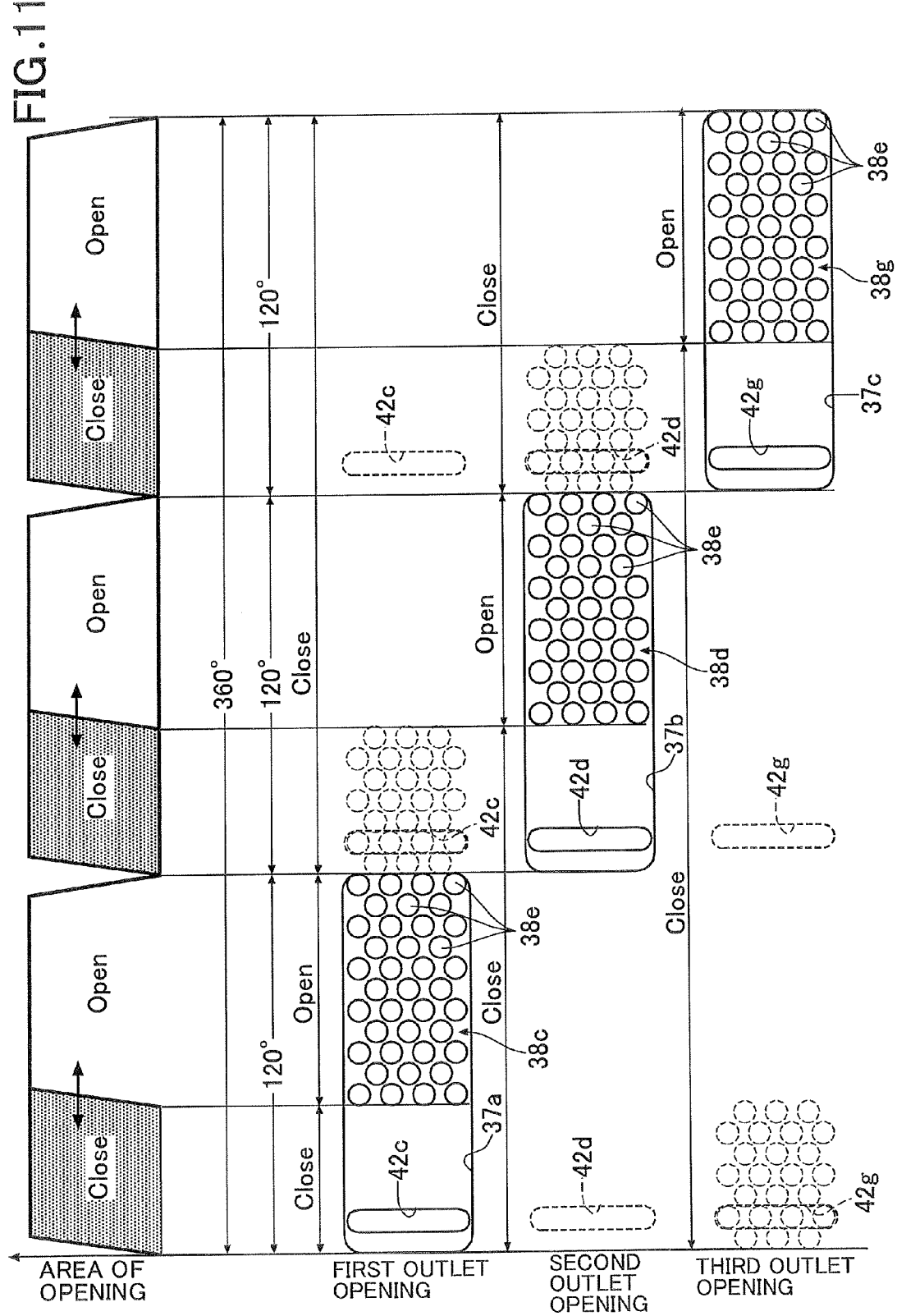
FIG. 11 is a view corresponding to FIG. 7. (fourth embodiment)

A fourth embodiment of the present invention is now explained by reference to FIG. 11.

In the above-mentioned first to third embodiments, the first and second outlet openings 37a and 37b of the sleeve 37 each have a central angle of 180°, the first and second communication hole groups 38c and 38d of the distributor 38 each have a central angle of 180°, and the two pairs of first and second inlet openings 42c and 42d of the rotor 42 each have a phase difference of 180°. On the other hand, in the fourth embodiment, a sleeve 37 includes first to third outlet openings 37a, 37b, and 37c each having a central angle of 120°, a distributor 38 includes first to third communication hole groups 38c, 38d, and 38g each having a central angle of 120°, and a rotor 42 includes three sets of first to third inlet openings 42c, 42d, and 42g each having a phase difference of 120°.

A flow rate control valve 23 therefore can output three cycles of duty waveform per rotation of the rotor, and it is possible to obtain a higher duty frequency while keeping the rotational speed of a second drive source low. Furthermore, when the flow rate control valve 23 is fully closed (duty ratio=0%), compared with the first to third embodiments, it is possible to prevent liquid from short circuiting in the circumferential direction by passing through a gap between the outer peripheral face of the distributor 38 and the inner peripheral face of the sleeve 37.

Fifth Embodiment

Figure 12:
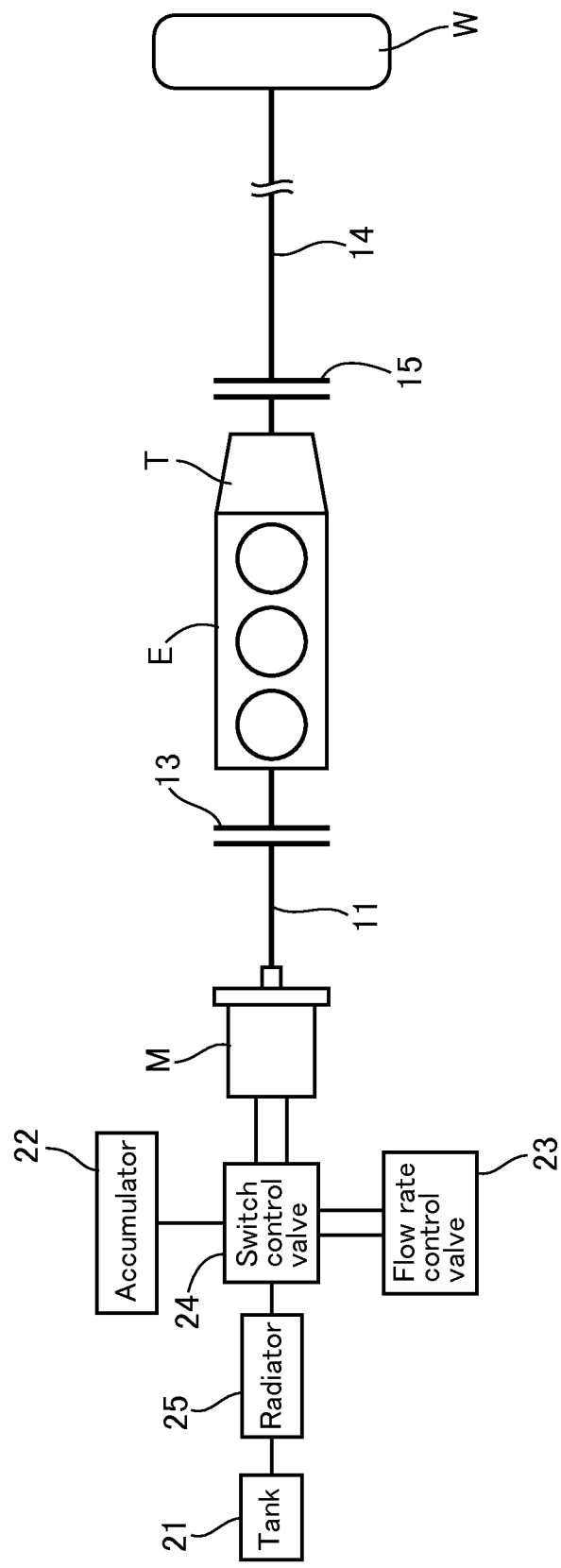
FIG. 12 is a diagram showing a driving force transmission system of a hydraulic hybrid vehicle to which the flow rate control valve of the present invention is applied. (fifth embodiment)

A fifth embodiment of the present invention is now explained by reference to FIG. 12.

In the fifth embodiment, the first gear 12, the second gear 16, the third gear 19, the fourth gear 20, the bypass shaft 17, and the third clutch 18 of the first embodiment (see FIG. 1) are omitted. In accordance with this embodiment, the structure becomes simple, but drag from the friction of an engine E occurs when regeneration is carried out by a pump/motor M.

Sixth Embodiment

Figure 13:
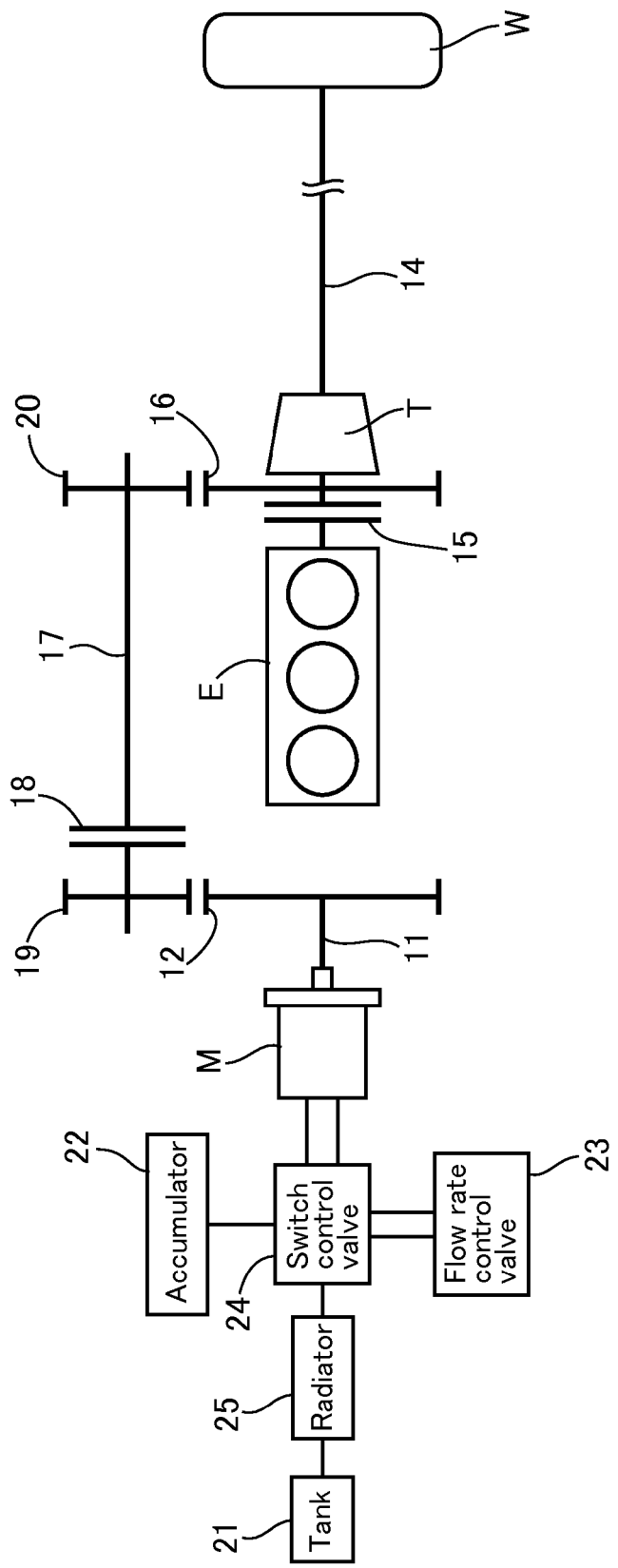
FIG. 13 is a diagram showing a driving force transmission system of a hydraulic hybrid vehicle to which the flow rate control valve of the present invention is applied. (sixth embodiment)

A sixth embodiment of the present invention is now explained by reference to FIG. 13.

In the sixth embodiment, the second clutch 15 and the second gear 16 of the first embodiment (see FIG. 1) are disposed between an engine E and a transmission T, the first clutch 13 is omitted, and a pump/motor M and the engine E are isolated from each other. In accordance with this embodiment, in addition to the operational effects of the first embodiment, freely controlling the reduction ratio between the pump/motor M and the driven wheel W by means of the transmission T enables driving and regeneration to be carried out efficiently by the pump/motor M.

Seventh Embodiment

Figure 14:
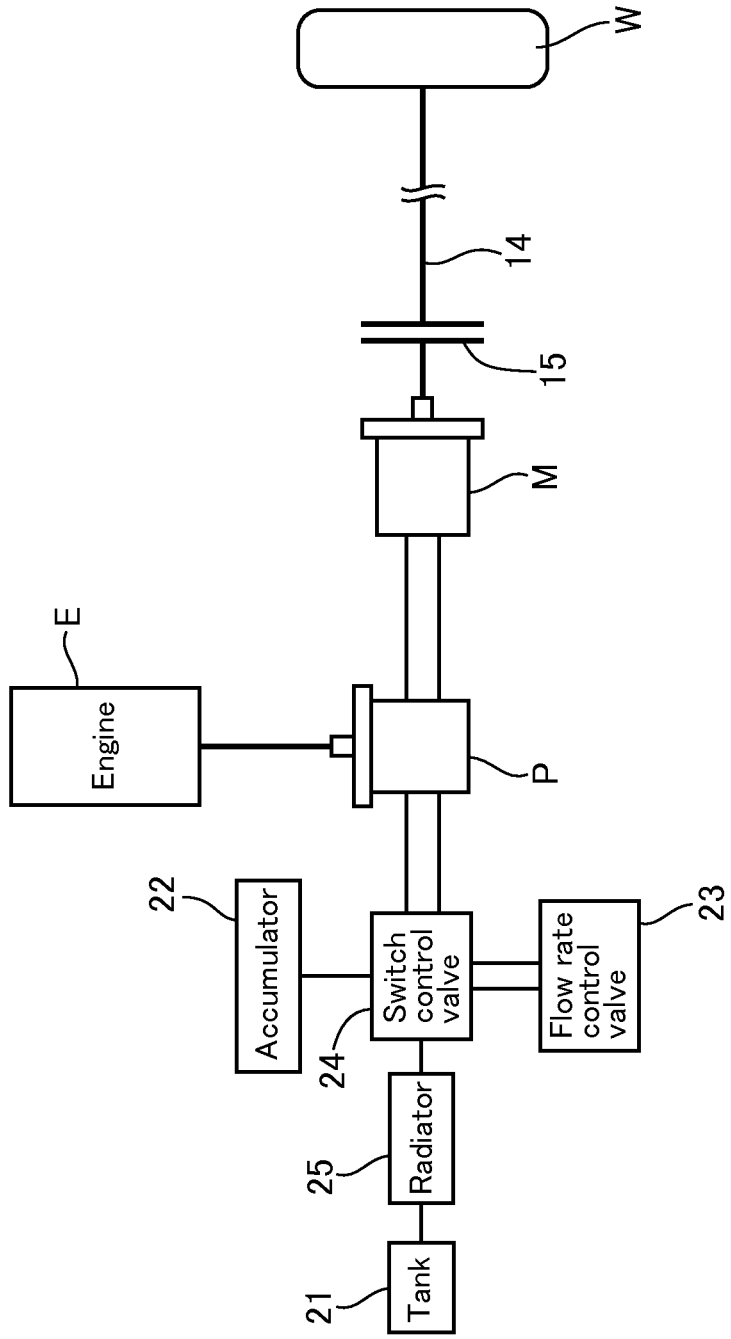
FIG. 14 is a diagram showing a driving force transmission system of a hydraulic hybrid vehicle to which the flow rate control valve of the present invention is applied. (seventh embodiment)

A seventh embodiment of the present invention is now explained by reference to FIG. 14.

The seventh embodiment includes a pump/motor M and a hydraulic pump P; the pump/motor M is connected to a driven wheel W and is used exclusively for driving/regeneration, and the hydraulic pump P, which is connected to an engine E that is used exclusively for generation of liquid pressure, generates liquid pressure for driving the pump/motor M or liquid pressure for storing pressure in an accumulator 22. In accordance with this embodiment, the engine E is run at a fixed point, thereby enabling fuel economy to be improved and emissions to be reduced.

Eighth Embodiment

Figure 15:
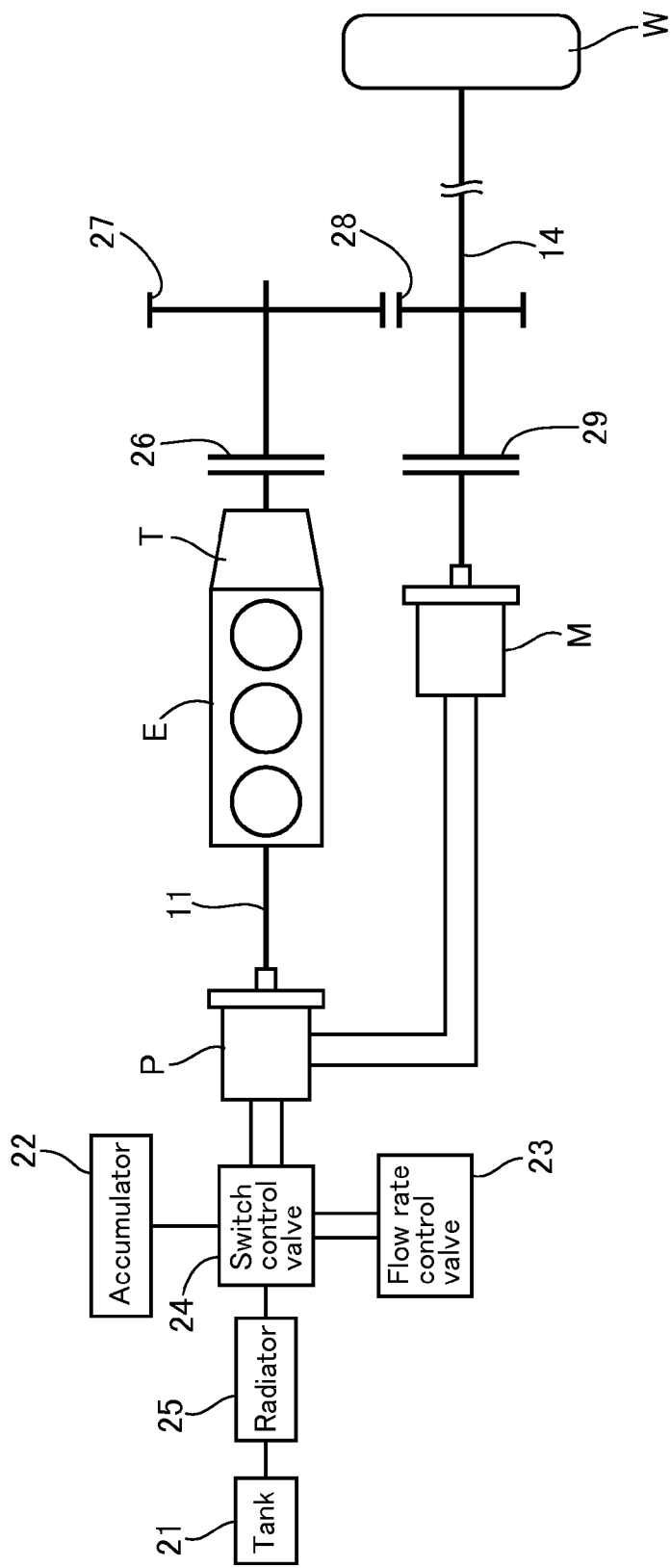
FIG. 15 is a diagram showing a driving force transmission system of a hydraulic hybrid vehicle to which the flow rate control valve of the present invention is applied. (eighth embodiment)

An eighth embodiment of the present invention is now explained by reference to FIG. 15.

The eighth embodiment also includes a pump/motor M and a hydraulic pump P, an engine E is connected to an output shaft 14 via a clutch 26, a gear 27, and a gear 28, the pump/motor M is also connected to the output shaft 14 via a clutch 29, and the hydraulic pump P is connected directly to the engine E. In accordance with this embodiment, the engine E is run at a fixed point in a state in which the clutch 26 is disengaged to thus drive the hydraulic pump P, and the pump/motor M is driven for traveling by means of liquid pressure generated by the hydraulic pump P, thereby enabling fuel economy to be improved and emissions to be reduced. It is of course possible to carry out traveling by means of the engine E on its own, traveling by means of the pump/motor M on its own, and traveling by cooperation of the engine E and the pump/motor M.

Ninth Embodiment

Figure 16:
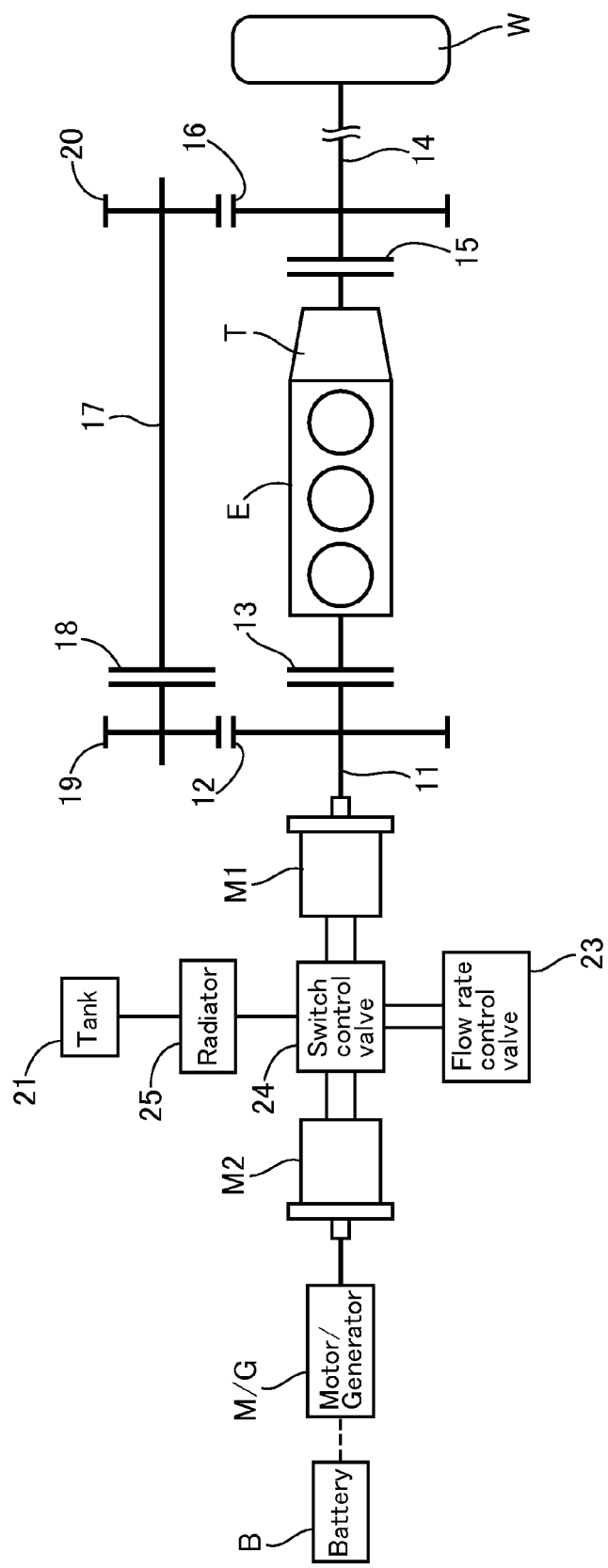
FIG. 16 is a diagram showing a driving force transmission system of a hydraulic hybrid vehicle to which the flow rate control valve of the present invention is applied. (ninth embodiment)

A ninth embodiment of the present invention is now explained by reference to FIG. 16.

The ninth embodiment is a modification of the first embodiment (see FIG. 1); in addition to a first pump/motor M1 connected directly to an engine E, it includes a second pump/motor M2 connected to a battery B via a motor/generator MG. In the first embodiment, energy for driving the first pump/motor M1 is stored in the accumulator 22 as hydraulic energy, whereas in the ninth embodiment, energy for driving the first pump/motor M1 is stored in the battery B as electrical energy, the motor/generator MG is operated as a motor by the battery B, the second pump/motor M2 is operated as a pump by the driving force of the motor/generator MG, thus generating liquid pressure for driving the first pump/motor M1, and the second pump/motor M2 is operated as a motor by means of liquid pressure generated by the first pump/motor M1 operating as a pump to thus cause the motor/generator MG to generate electricity and charge the battery B with the electrical energy.

In accordance with this ninth embodiment, since electrical energy is stored in the battery B, compared with a case in which hydraulic energy is stored in an accumulator 22, energy density can be enhanced.

Tenth Embodiment

Figure 17:
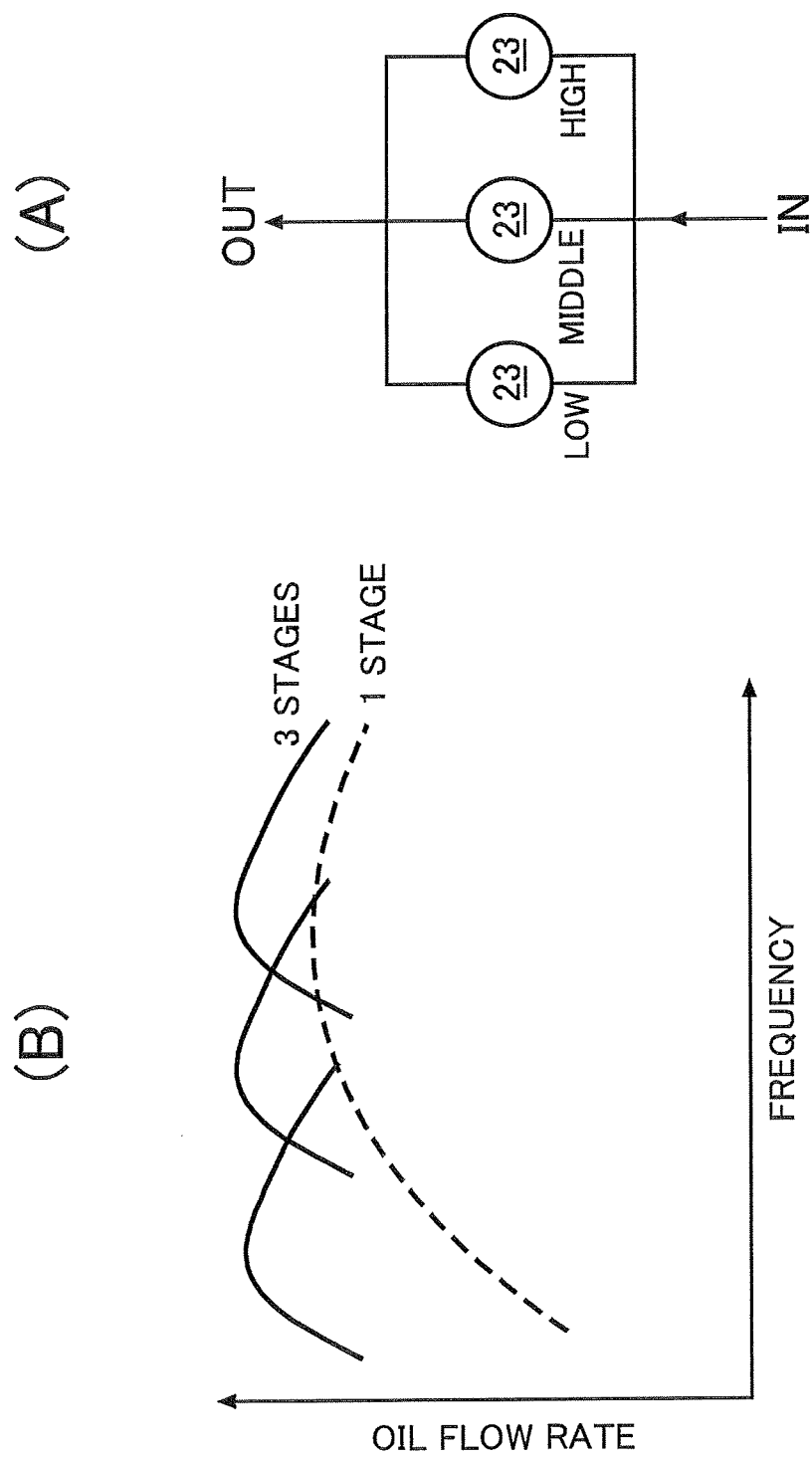
FIG. 17 is a diagram showing an embodiment employing a plurality of flow rate control valves. (tenth embodiment)

A tenth embodiment of the present invention is now explained by reference to FIG. 17.

The above-mentioned first to ninth embodiments include only one flow rate control valve 23, but the tenth embodiment includes three flow rate control valves 23 connected in parallel; the first flow rate control valve 23 has the characteristic that the efficiency is high in a low frequency region, the second flow rate control valve 23 has the characteristic that the efficiency is high in a middle frequency region, and the third flow rate control valve 23 has the characteristic that the efficiency is high in a high frequency region. Therefore, operating one of the three flow rate control valves 23 according to a required frequency region enables the efficiency to be further enhanced.

Eleventh Embodiment

An eleventh embodiment of the present invention is now explained by reference to FIG. 18 to FIG. 21. The eleventh embodiment is different from the first embodiment in terms of a liquid pressure circuit and the structure of a switch valve 61.

Figure 18:
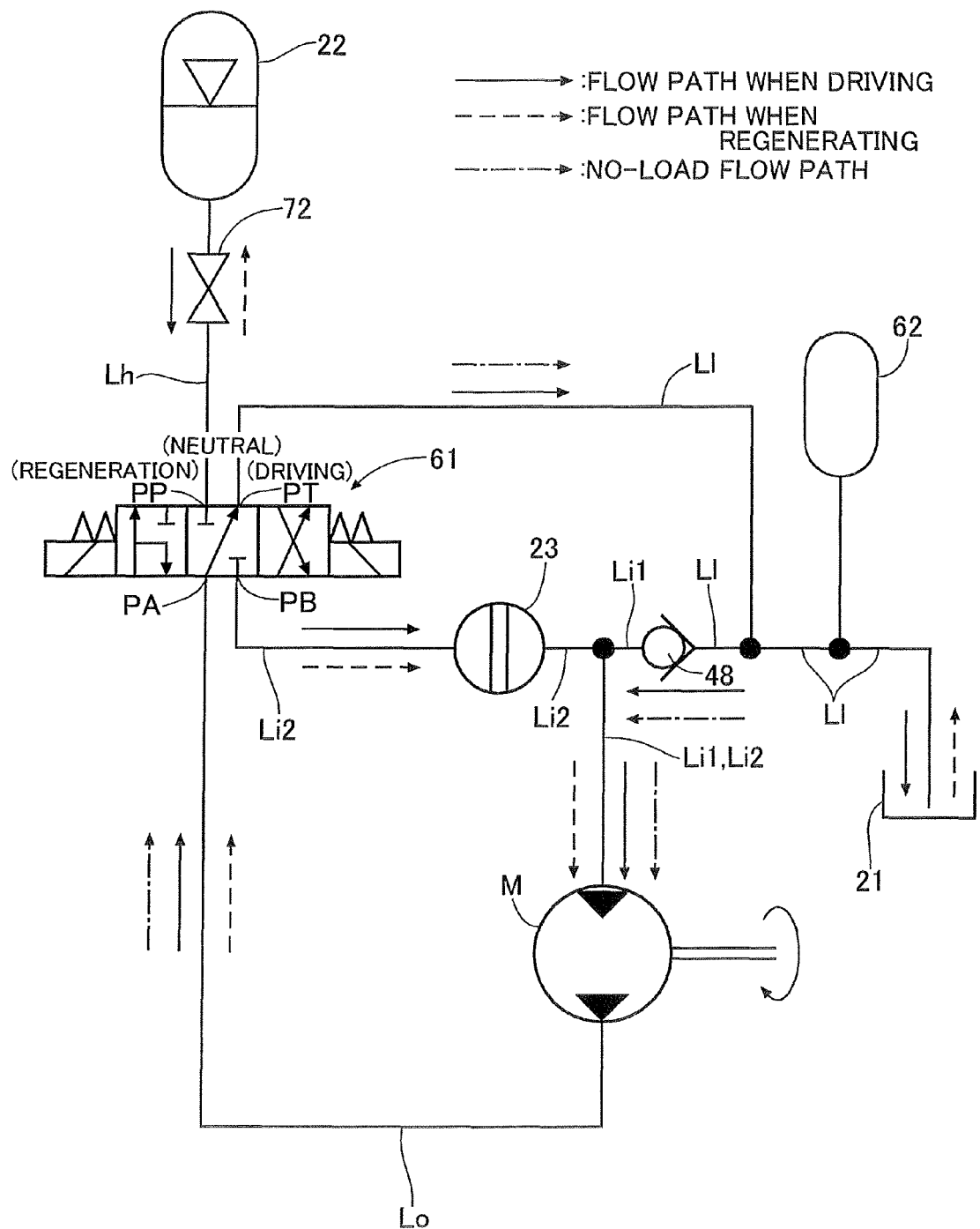
FIG. 18 is a diagram showing an equivalent circuit of a drive circuit for a pump/motor. (eleventh embodiment)

As shown in FIG. 18, the switch valve 61 includes four ports PA, PB, PP, and PT; the port PA is connected to a discharge port of a pump/motor M via a discharge liquid path Lo, the port PB is connected to an intake port of the pump/motor M via a second intake liquid path Li2 having a flow rate control valve 23 disposed therein, the port PP is connected to an accumulator 22 via a high pressure liquid path Lh, and the port PT is connected to a tank 21 via a low pressure liquid path Ll having an air chamber 62. Furthermore, the intake port of the pump/motor M is connected to the low pressure liquid path Ll via a first intake liquid path Li1, and a part of the first intake liquid path Li1 connected to the low pressure liquid path Ll is provided with a check valve 48 that only allows liquid to flow from the tank 21 side to the pump/motor M side. Disposed in the high pressure liquid path Lh is a stop valve 72 for protecting the accumulator 22.

Figure 19:
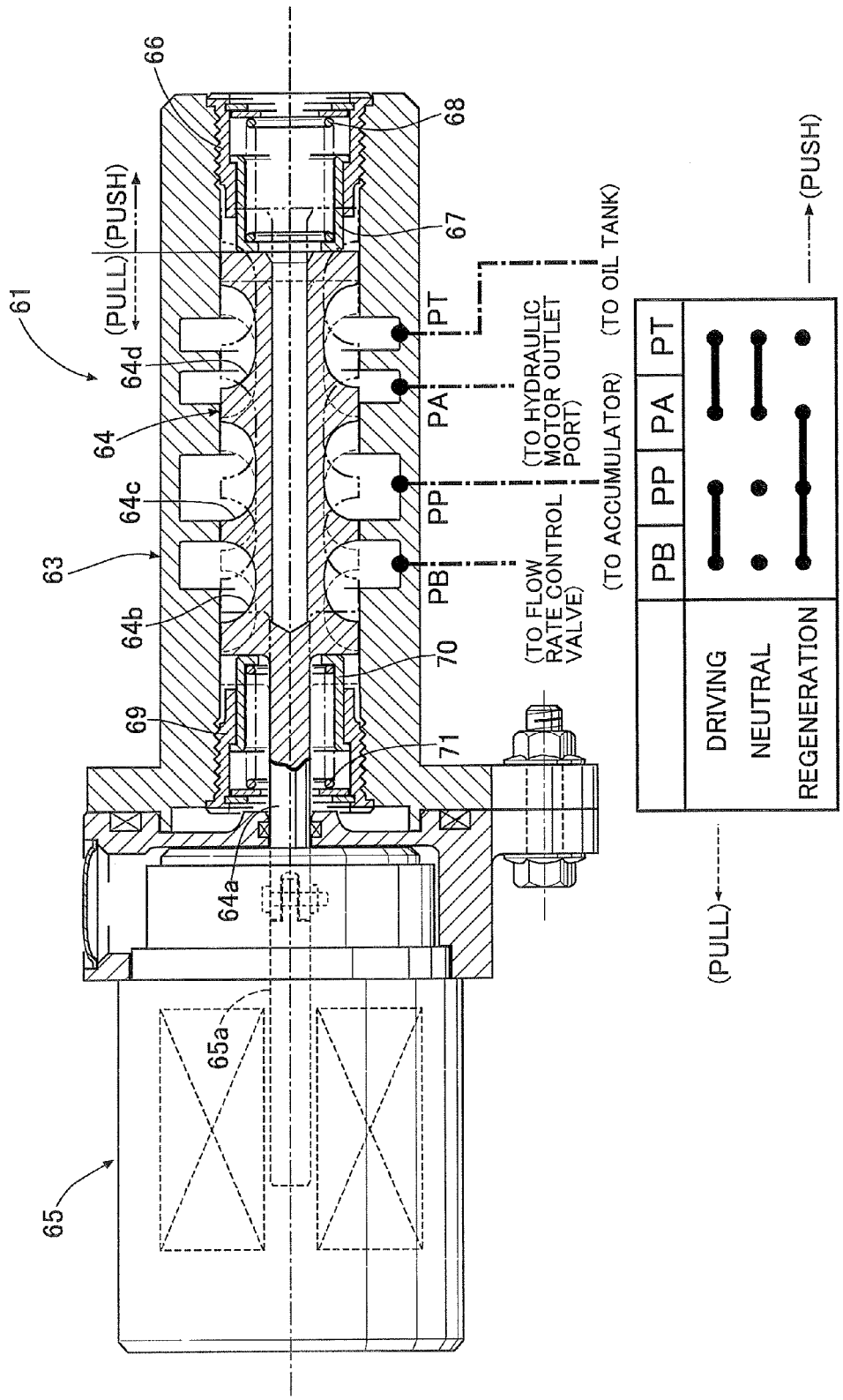
FIG. 19 is a diagram showing the structure and operation of a flow rate control valve. (eleventh embodiment)
Figure 20:
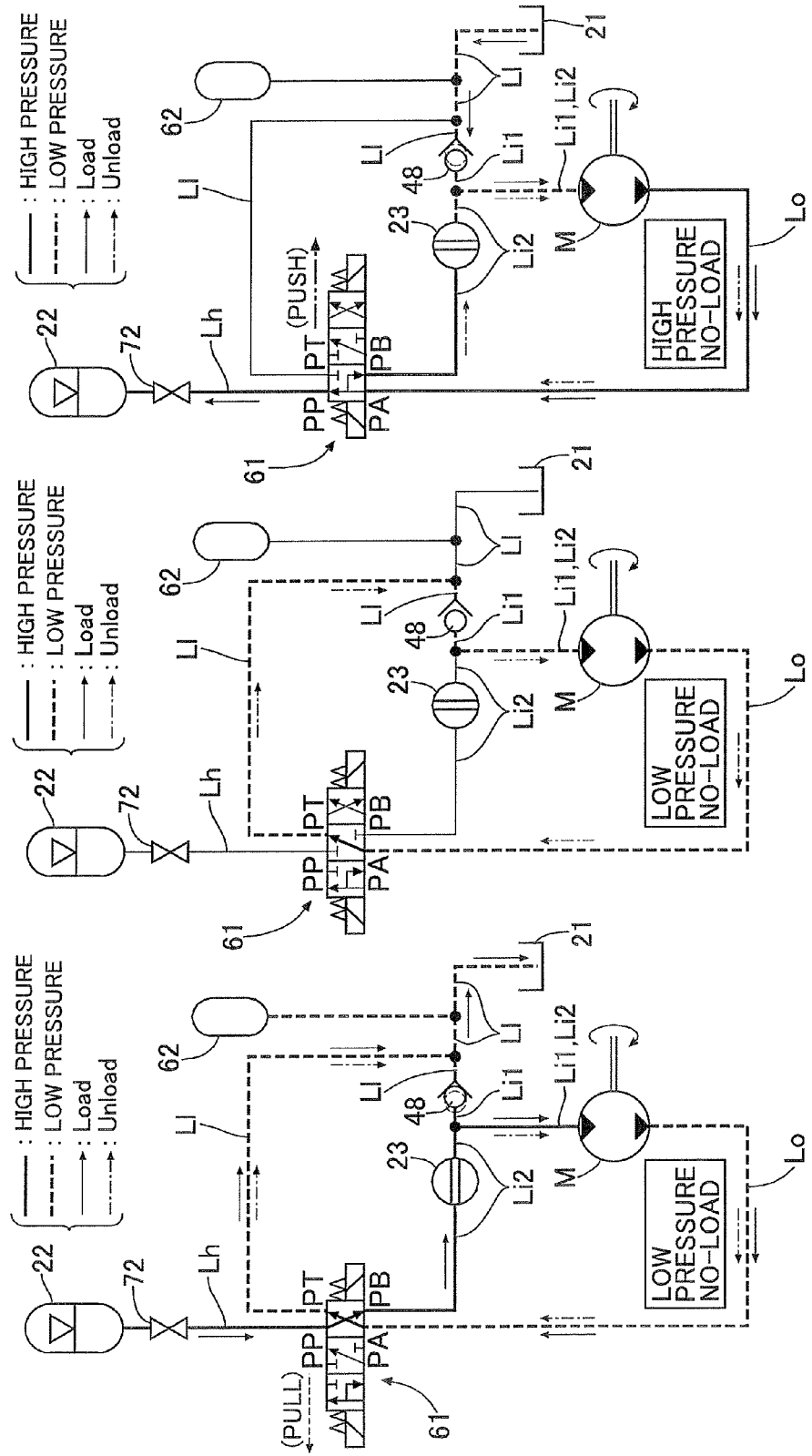
FIG. 20 is a diagram for explaining the operation of a drive circuit for the pump/motor. (eleventh embodiment)

The switch valve 61 can switch between a 'drive' position in which the pump/motor M is driven as a motor, a 'regeneration' position in which regeneration is carried out using the pump/motor M as a pump, and a 'neutral' position in which the pump/motor M is rotated without load. When the switch valve 61 is at the 'drive' position, the discharge liquid path Lo is connected to the low pressure liquid path Ll, and the high pressure liquid path Lh is connected to the second intake liquid path Li2. When the switch valve 61 is at the 'regeneration' position, the discharge liquid path Lo is connected to the high pressure liquid path Lh and the second intake liquid path Li2, and the low pressure liquid path Ll is cut off. When the switch valve 61 is at the 'neutral' position, the discharge liquid path Lo is connected to the low pressure liquid path Ll, and the high pressure liquid path Lh and the second intake liquid path Li2 are cut off As shown in FIG. 19, the switch valve 61 is formed from a spool valve, and a rod portion 64a of a spool 64 slidably fitted into the interior of a valve housing 63 is connected to an output shaft 65a of a push/pull type solenoid 65. A first stopper 67 slidably fitted into a stopper guide 66 fixed to the extremity side of the valve housing 63 is urged leftward in the figure by a spring 68, a second stopper 70 slidably fitted into a stopper guide 69 fixed to the base side of the valve housing 63 is urged rightward in the figure by a spring 71, and the spool 64 is sandwiched between the first and second stoppers 67 and 70 and held at the 'neutral' position. If the solenoid 65 is driven in the pull direction from this state, the second stopper 70 moves leftward together with the spool 64 while compressing the spring 71 to thus switch to the 'drive' position, whereas if the solenoid 65 is driven in the push direction the first stopper 67 moves rightward together with the spool 64 while compressing the spring 68 to thus switch to the 'regeneration' position.

The valve housing 63 has the four ports PA, PB, PP, and PT formed therein, and the spool 64 has a first groove 64b, a second groove 64c, and a third groove 64d formed from the left side to the right side in the figure. When the spool 64 moves leftward from the illustrated 'neutral' position to the 'drive' position, the port PB and the port PP are made to communicate via the second groove 64c, and the port PA and the port PT are made to communicate via the third groove 64d. When the spool is at the illustrated 'neutral' position the port PA and the port PT are made to communicate via the third groove 64d. When the spool 64 moves rightward from the illustrated 'neutral' position to the 'regeneration' position, the port PB and the port PP are made to communicate via the first groove 64b, and the port PP and the port PA are made to communicate via the second groove 64c.

FIG. 20(A) shows the liquid pressure circuit when the switch valve 61 is at the 'drive' position and the pump/motor M operates as a motor; when there is a load when the flow rate control valve 23 is in a duty ON state liquid from the accumulator 22 flows via the path: switch valve 61→flow rate control valve 23→pump/motor M→switch valve 61→tank 21, and when there is no load when the flow rate control valve 23 is in a duty OFF state liquid circulates without load through a closed no-load circuit formed from pump/motor M→switch valve 61→check valve 48→pump/motor M.

FIG. 20(B) shows the liquid pressure circuit when the switch valve 61 is at the 'neutral' position and the pump/motor M rotates without load, and liquid circulates without load through a closed circuit formed from pump/motor M→switch valve 61→check valve 48→pump/motor M.

FIG. 20(C) shows the liquid pressure circuit when the switch valve 61 is at the 'regeneration' position and the pump/motor M operates as a pump; when there is a load when the flow rate control valve 23 is in a duty OFF state liquid from the tank 21 flows via the path: check valve 48→pump/motor M→switch valve 61→accumulator 22, and when there is no load when the flow rate control valve 23 is in a duty ON state liquid circulates without load through a closed no-load circuit formed from pump/motor M→flow rate control valve 23→pump/motor M.

In this way, in accordance with the present embodiment also, the pump/motor M can be run in three modes, that is, drive, regeneration, and neutral modes, by a liquid pressure circuit having a simple structure with a small number of components.

When the switch valve 61 is at the 'regeneration' position and the pump/motor M operates as a pump, since when there is a load the check valve 48 opens and liquid flows in the low pressure liquid path L1, and when there is no load the check valve 48 closes and no liquid flows in the low pressure liquid path L1, movement and stopping of liquid in the low pressure liquid path L1 is repeated with a short cycle and the liquid does not flow smoothly, thereby causing the problem that cavitation easily occurs. However, in the present embodiment, since the air chamber 62 is connected to the low pressure liquid path L1, change in pressure of the low pressure liquid path L1 can be absorbed by change in volume of air stored in the air chamber 62, thereby preventing effectively the occurrence of cavitation.

Moreover, when the pump/motor M operates as a pump, since the check valve 48, which has a relatively small flow resistance when the valve is open, is positioned in proximity to the intake port thereof, compared with a case in which the switch valve 61, which has a relatively large flow resistance when the valve is open, is positioned there, the intake resistance of the pump/motor M decreases, and this is advantageous in terms of suppressing the occurrence of cavitation.

Figure 21:
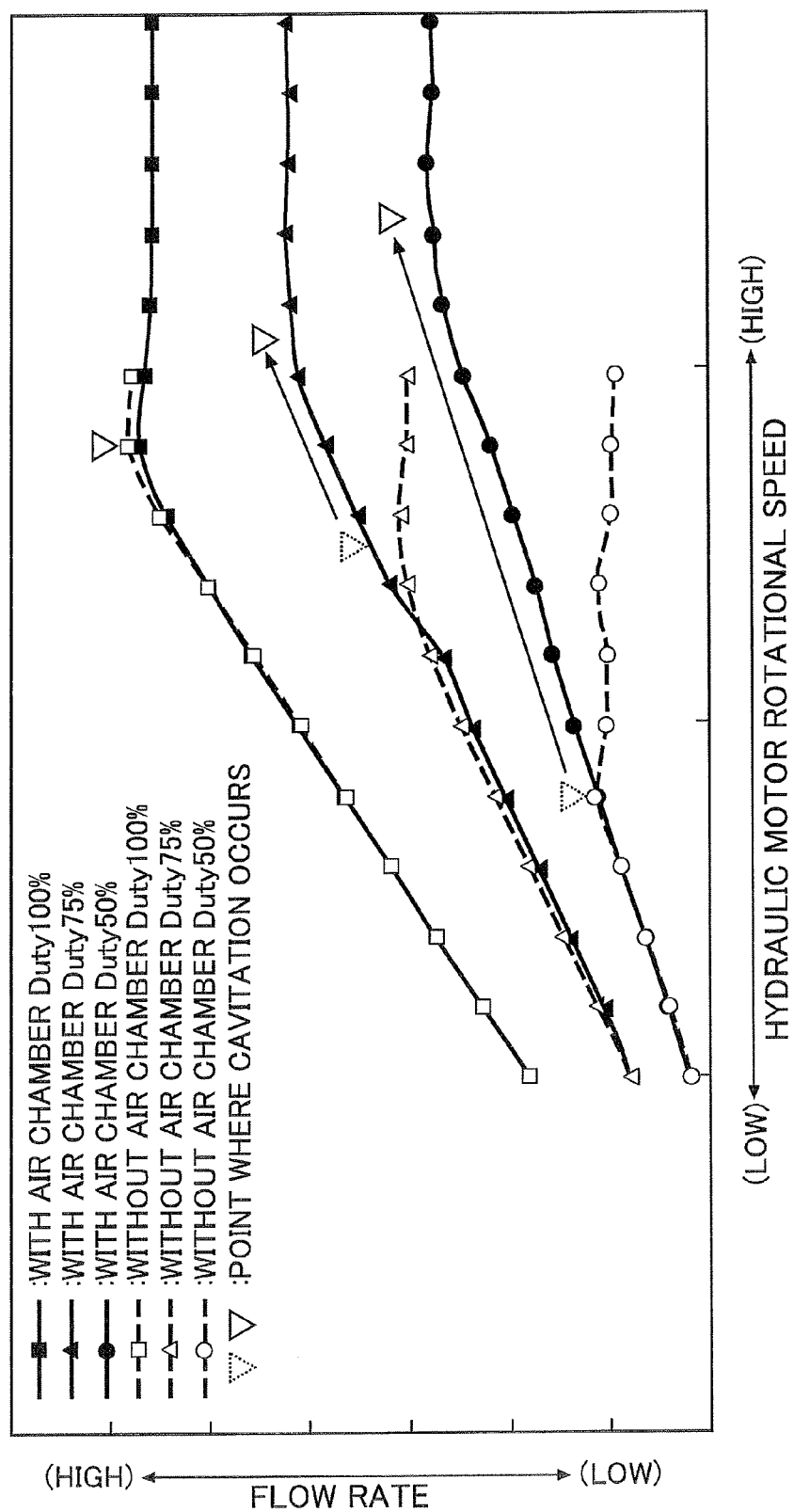
FIG. 21 is a graph for explaining the effect of an air chamber. (eleventh embodiment)

FIG. 21 shows the relationship between liquid flow rate and rotational speed of the pump/motor M, which operates as a pump, with respect to the liquid pressure circuit equipped with the air chamber 62 (solid line) and the liquid pressure circuit without the air chamber 62 (broken line). In the liquid pressure circuit without the air chamber 62 (broken line), cavitation occurs at an early stage accompanying an increase in the rotational speed of the pump/motor M, particularly for a low duty ratio, and it can be seen that the liquid flow rate reaches a limit. On the other hand, in the liquid pressure circuit equipped with the air chamber 62 (solid line), the occurrence of cavitation is suppressed effectively for any duty ratio, and it can be seen that the liquid flow rate increases until the pump/motor M attains a high rotational speed. It is not necessary for the air chamber 62 to have a large volume, and a sufficient effect can be obtained from one with a small volume (for example, 100 cc).

In the present embodiment, as shown in FIG. 20(A), no-load when the pump/motor M operates as a motor is 'low pressure no-load', and since both the intake port and the discharge port of the pump/motor M are at a low pressure, it is possible to enhance the efficiency by reducing liquid leakage during no-load when operating as a motor. On the other hand, as shown in FIG. 20(C), no-load when the pump/motor M operates as a pump is 'high pressure no-load', and since both the intake port and the discharge port of the pump/motor M are at a high pressure, liquid leakage during no-load when operating as a pump increases, thus slightly degrading the efficiency.

Moreover, as shown in FIG. 20(C), the discharge port of the pump/motor M operating as a pump is always at a high pressure, and there is no change in pressure between when there is a load and when there is no load, and it is therefore possible to stabilize operation when the pump/motor M is carrying out regeneration. On the other hand, as shown in FIG. 20(A), since the intake port of the pump/motor M operating as a motor is at a high pressure when there is a load and at a low pressure when there is no load, stability when the pump/motor M is carrying out driving is slightly degraded.

As described above, in the liquid pressure circuit of the first embodiment (see FIG. 8 and FIG. 9), low pressure no-load is carried out when the pump/motor M operates as a pump, thus enabling liquid leakage to be reduced, and in the liquid pressure circuit of the eleventh embodiment (see FIG. 18 and FIG. 20), low pressure no-load is carried out when the pump/motor M operates as a motor, thus enabling liquid leakage to be reduced; it is therefore possible, depending on the priority thereof, to select one of the two liquid pressure circuits, thereby increasing the degree of freedom in design.

Furthermore, in the liquid pressure circuit of the first embodiment stability can be enhanced by preventing the occurrence of change in pressure on the inlet port side, which is at a high pressure when the pump/motor M operates as a motor, and in the liquid pressure circuit of the eleventh embodiment stability can be enhanced by preventing the occurrence of change in pressure in the discharge port side, which is at a high pressure when the pump/motor M operates as a pump; it is therefore possible, depending on the priority thereof, to select one of the two liquid pressure circuits, thereby increasing the degree of freedom in design.

Modes for carrying out the present invention are explained above, but the present invention may be modified in a variety of ways as long as the modifications do not depart from the spirit and scope thereof.

For example, even if the direction of flow of liquid is reversed, the flow rate control valve 23 of each embodiment can normally exhibit a function of carrying out PWM control of liquid flow rate at any duty ratio and any duty frequency. That is, in each embodiment, liquid flows in from the input port 61e side and flows out from the output port 61f side, but the functions of the ports may be swapped so that liquid flows in from the output port 61f side and flows out from the input port 61e side. Therefore, the input port and the inlet opening of the embodiment include ones having the function of liquid flowing out and the output port and the outlet opening include ones having the function of liquid flowing in.

Furthermore, the air chamber 62 of the eleventh embodiment may be added between the tank 21 and the switch valve 24b in the liquid pressure circuit of the first embodiment (see FIG. 8), thereby preventing the occurrence of cavitation more effectively when the pump/motor M is operated as a pump.

Furthermore, in the embodiments, the flow rate control valve 23 of the present invention is applied to a hydraulic hybrid vehicle, but the flow rate control valve 23 of the present invention may be used in any application. Applications to an automobile, etc. include those below.

(1) Flow rate control valve applied to variable flow rate oil pump
(2) Flow rate control valve applied to variable flow rate water pump
(3) Flow rate control valve applied to engine injector
(4) Flow rate control valve applied to air conditioner coolant pump
(5) Flow rate control valve applied to engine throttle valve
(6) Flow rate control valve applied to turbo boost pressure control

The invention claimed is:

1. A liquid pressure circuit that has provided between an accumulator and a tank a pump/motor that can operate as a motor and a pump, the liquid pressure circuit controlling an output of the motor and a volume output of the pump by duty controlling a flow rate of a liquid by means of a flow rate control valve, the liquid pressure circuit comprising a high pressure liquid path connected to the accumulator, a low pressure liquid path connected to the tank, first and second intake liquid paths connected to an intake port of the pump/motor, a discharge liquid path connected to a discharge port of the pump/motor, a check valve that is disposed in the first intake liquid path and only allows liquid to flow from the low pressure liquid path to the first intake liquid path, the flow rate control valve disposed in the second intake liquid path, and a switch valve that switches connection states of the high pressure liquid path, the low pressure liquid path, the second intake liquid path, and the discharge liquid path, the switch valve being capable of switching between a drive position in which the discharge liquid path is connected to the low pressure liquid path and the high pressure liquid path is connected to the second intake liquid path, a regeneration position in which the discharge liquid path is connected to the high pressure liquid path and the second intake liquid path and the low pressure liquid path is cut off, and a neutral position in which the discharge liquid path is connected to the low pressure liquid path and the high pressure liquid path and the second intake liquid path are cut off.

2. The liquid pressure circuit according to claim 1, wherein an air chamber is connected between the tank and a part of the low pressure liquid path that is connected to the first intake liquid path.

* * * * *